United States Patent [19]
Brogdon et al.

[11] Patent Number: 6,164,259
[45] Date of Patent: Dec. 26, 2000

[54] ENGINE BALANCE APPARATUS AND ACCESSORY DRIVE DEVICE

[75] Inventors: James William Brogdon, Northville; David Keith Gill, Novi, both of Mich.

[73] Assignee: Teledyne Technologies Incorporated, Los Angeles, Calif.

[21] Appl. No.: 09/124,383

[22] Filed: Jul. 28, 1998

[51] Int. Cl.[7] .................................................. F02B 75/06
[52] U.S. Cl. ........................ 123/192.2; 74/603; 74/604
[58] Field of Search ........................ 123/192.2; 74/603, 74/604

[56] References Cited

U.S. PATENT DOCUMENTS

| | | |
|---|---|---|
| 1,855,570 | 4/1932 | Edison . |
| 2,426,875 | 9/1947 | Hasbrouck et al. . |
| 2,666,418 | 1/1954 | Garnier et al. . |
| 3,402,707 | 9/1968 | Heron . |
| 3,415,237 | 12/1968 | Harkness . |
| 3,581,628 | 6/1971 | Williams . |
| 3,667,317 | 6/1972 | Hillingrathner . |
| 4,320,671 | 3/1982 | Curasi ........................................ 74/604 |
| 4,538,481 | 9/1985 | Ohta et al. ................................ 74/603 |

*Primary Examiner*—Tony M. Argenbright
*Assistant Examiner*—Hai Huynh
*Attorney, Agent, or Firm*—P J Viccaro

[57] ABSTRACT

A balancing mechanism for an engine that has a rotating crankshaft and reciprocating pistons such as those engines used in automobiles, aircrafts, boats, piston-driven compressors, piston-driven slider crank mechanisms, etc. The present balancing mechanism may comprise a first balance mass non-rotatably affixed to the crankshaft and a second balance mass rotatably supported on the crankshaft. A driver assembly is affixed to crankshaft to cause the second balance mass to rotate in a direction that is opposite to the direction in which the crank shaft is rotating. The driver assembly may include auxiliary gears configured to transport rotary power to auxiliary components.

45 Claims, 15 Drawing Sheets

ENGINE BALANCE APPARATUS AND ACCESSORY DRIVE DEVICE

FEDERALLY SPONSORED RESEARCH

Certain of the research leading to the present invention was sponsored by the United States Government under National Aeronautics and Space Administration (NASA) Cooperative Agreement No. NCC3-515. The United States Government may have certain rights in this invention.

CROSS-REFERENCE TO RELATED APPLICATIONS

Not applicable.

BACKGROUND OF THE INVENTION

1. Field of the Invention

The subject invention relates to engines and, more particularly, to apparatus for countering unbalanced forces generated in engines and harnessing power from an engine's crankshaft to drive accessory apparatuses.

2. Description of the Invention Background

Over the years, perhaps due to declining fossil fuel reserves and other economic factors, designers have been challenged to develop engines that are lighter and compact, more fuel efficient, more reliable, and easier to maintain than prior engines. To address such challenges, engine designers must develop new solutions to old problems that have confronted engine designers for years. One such problem involves the need to minimize vibrations created during, the engine's cycle. This need almost universally encompasses all types of engine designs regardless of their specific applications and tends to be very important in most, if not all, engines that employ reciprocating pistons.

Within an engine structure, forces are created by the inertia of their moving parts and by the varying gas pressures in the engine cylinders. Such forces tend to result in deflections in the structural members of the engine. Thus, vibrations of varying amplitudes and frequencies are developed throughout the engine structure and are transmitted to a support frame through the engine mounts and ultimately to various other components attached to the frame. These vibratory motions must be controlled to avoid malfunction, mechanical failure and/or excessive engine noise.

Piston reciprocation is one of the main causes of engine vibration. Each piston has a mass and inertia and, as it reciprocates within a cylinder, it applies a force to the engine structure that lies along the cylinder axis. One method employed in the past to counterbalance such piston forces involved adding a counterweight to the crankshaft to provide an inertia force in a direction that is opposite to the direction of the piston force. However, the use of such counterweights alone proved to be an ineffective method for balancing the inertia forces generated by the piston, because the counterweights themselves created additional unbalanced forces during rotation of the crankshaft.

Thus, various other counterbalance configurations have been developed in an effort to address those shortcomings. One prior method involved the use of counter-rotating counterbalances that were timed and so proportioned such that the components of their centrifugal forces in a first direction resulting from their rotation would be additive and in opposition to the piston forces to achieve a desired balance, while the components of their centrifugal forces in a second direction would be in opposition to each other so as to cancel each other out. However, the components and drive arrangements for effecting such counter-rotation of counterweights typically occupied a significant amount of space within the engine and can add undesirable weight to the engine.

U.S. Pat. No. 3,415,237 to Harkness purported to solve the above-mentioned problems associated with driving counterbalances within a single cylinder four stroke engine. That patent teaches that counterweights located external to the engine crankcase are driven through a gear arrangement attached to the camshaft. However, such arrangement was not particularly well-suited for use in multiple cylinder engines.

The designers of multiple cylinder engines must also attempt to compensate for forces known as "couples" that are generated during the combustion cycles. A couple comprises forces that want to turn the engine about its vertical axis. In multiple cylinder engines, it is desirable for the pistons in one engine bay to not reach the top of their respective strokes at the same time that the pistons in an adjacent bay are reaching their respective top strokes. If they do, engine vibration may be exacerbated. Thus, multiple cylinder engines are designed to achieve "even firing" between the cylinders. However, because the pistons create forces in different directions and because the axes along which those forces lie are separated from each other(i.e., not coaxial), couples are generated which, if left unbalanced or uncountered can lead to more engine vibration.

U.S. Pat. No. 4,632,072 to Brogdon discloses a balancing arrangement for a multiple cylinder combustion engine. In that engine, a pinion gear is coaxially attached to each axial end of the crankshaft. Each pinion gear includes a counterweight that is radially spaced from the crankshaft axis of rotation. At least one idler pinion gear is rotatably mounted to the engine housing and is in meshing engagement with one of the pinion gears attached to the crankshaft. Each idler pinion includes a weighted portion spaced from its axis of rotation. Both the counterweights and the weighted portions of the idler pinions are angularly spaced from each other by a predetermined amount so that, during rotation of the crankshaft, the centrifugal force-vectors of the crankshaft counterweight and idler pinion weighted portions cancel the primary moment (couple) generated by the piston reciprocation acting on axially spaced positions along, the crankshaft.

Still other arrangements have been devised to address engine vibration. For example, U.S. Pat. No. 1,855,570 to Edison, U.S. Pat. No. 2,426,875 to Hasbrouk et al., U.S. Pat. No. 2,666,418 to Garnier et al., U.S. Pat. No. 3,402,707 to Heron, U.S. Pat. No. 3,581,628 to Williams, and U.S. Pat. No. 3,667,317 to Hillingrathner disclose various means for controlling engine vibration.

Also in most modem day engine configurations and applications, a variety of ancillary components that require some form of power to function are employed. For example, many engine applications require the use of hydraulic pumps, vacuum pumps, fans, etc. Thus, it is desirable to obtain as much of that power from the engine itself, if it can be done without noticeably effecting the engine's output. While various ancillary drive schemes, such as belts and pulleys have been employed, they are not well-suited for use in applications wherein minimization of engine size and engine weight is an important consideration.

Perhaps no industry has experienced the above-mentioned challenges more so than the aircraft industry. It is axiomatic that it is particularly desirable to have a small, lightweight, fuel efficient aircraft engine that is reliable and can be readily maintained. However, the various methods discussed above do not lend themselves well for use in such applications wherein engine size, weight and reliability may be crucial.

Thus, there is a need for an apparatus for effectively reducing engine vibration.

There is a further need for apparatus that can effectively counterbalance forces generated within an engine.

There is still another need for apparatus having the above-mentioned characteristics and that is relatively compact and adds little weight to the engine when compared to prior engine balance arrangements.

Another need exists for apparatus with the above characteristics that does not require the numerous parts commonly associated with prior engine balance schemes.

Yet another need exists for apparatus with the above-mentioned characteristics that would permit the use of smaller engine bearings within the engine, which ultimately can result in a lighter and less costly engine.

There is another need for an apparatus that reduces friction and power loss in an engine that employs reciprocating pistons.

Another need exists for a compact drive arrangement for rotating a balance mass for a crankshaft.

A further need exists for a compact drive arrangement for harnessing engine power to power ancillary components.

SUMMARY OF THE INVENTION

In accordance with a particularly preferred form of the present invention, there is provided a balancing apparatus for an engine having a rotating crankshaft that has a crankshaft axis. In a preferred form, the balancing apparatus includes a first balance mass that is non-rotatably affixed to the crankshaft and a second balance mass that is rotatably supported on the crankshaft. In addition, a driver is attached to the crankshaft for causing the second balance mass to rotate in a direction opposite to the direction of rotation of the crankshaft.

The present invention also comprises a balancing apparatus for an engine having a rotating crankshaft that has a crankshaft axis. The balancing apparatus may comprise a first balance mass that is non-rotatably attached to the crankshaft and a second balance mass that is rotatably supported on the crankshaft. An aft driver is affixed to the crankshaft for causing the second balance mass to rotate about the axis of the crankshaft in a direction that is opposite to a rotational direction of the crankshaft. The invention further includes a primary balance mass that is affixed to the crankshaft and a secondary balance mass that is rotatably supported on the crankshaft. In addition, this embodiment includes a fore driver affixed to the crankshaft for causing the secondary balance mass to rotate about the crankshaft in the direction that is opposite to the rotational direction of the crankshaft.

Another embodiment of the subject invention comprises a drive assembly for driving a mass rotatably mounted on a rotating shaft in a predetermined rotational direction about the rotating shaft. In a preferred form, the drive assembly comprises a first gear that is affixed to the rotating shaft and a second gear that is affixed to the mass and is intermeshed with the first gear.

The present invention also comprises a method for counteracting forces generated within an engine that has a rotating crankshaft that rotates in a first direction and generates a rotational force. The method may comprise affixing a first balance mass to the crankshaft and supporting a second balance mass on the crankshaft for coaxial rotation about an axis of the crankshaft. The method may further comprise utilizing at least a portion of the rotational force generated by the crankshaft to cause the second balance mass to rotate about the crankshaft in a second direction opposite to the first direction.

It is a feature of the present invention to provide a unique method and apparatus for reducing engine vibration.

It is another feature of the present invention to provide apparatus that has the above-mentioned attributes and that is relatively compact and adds less weight to the engine structure when compared to prior balance arrangements.

Another feature of the present invention is to enable lighter bearings to be used to support a crankshaft within the engine.

Another feature of the invention is to provide a novel apparatus for harnessing some o01 the rotational power of the crankshaft so that it can be used to power auxiliary components.

Accordingly, the present invention provides solutions to the shortcomings of prior engine balancing mechanisms and schemes. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein.

DETAILED DESCRIPTION OF THE PREFERRED EMBODIMENTS

Figure 1:
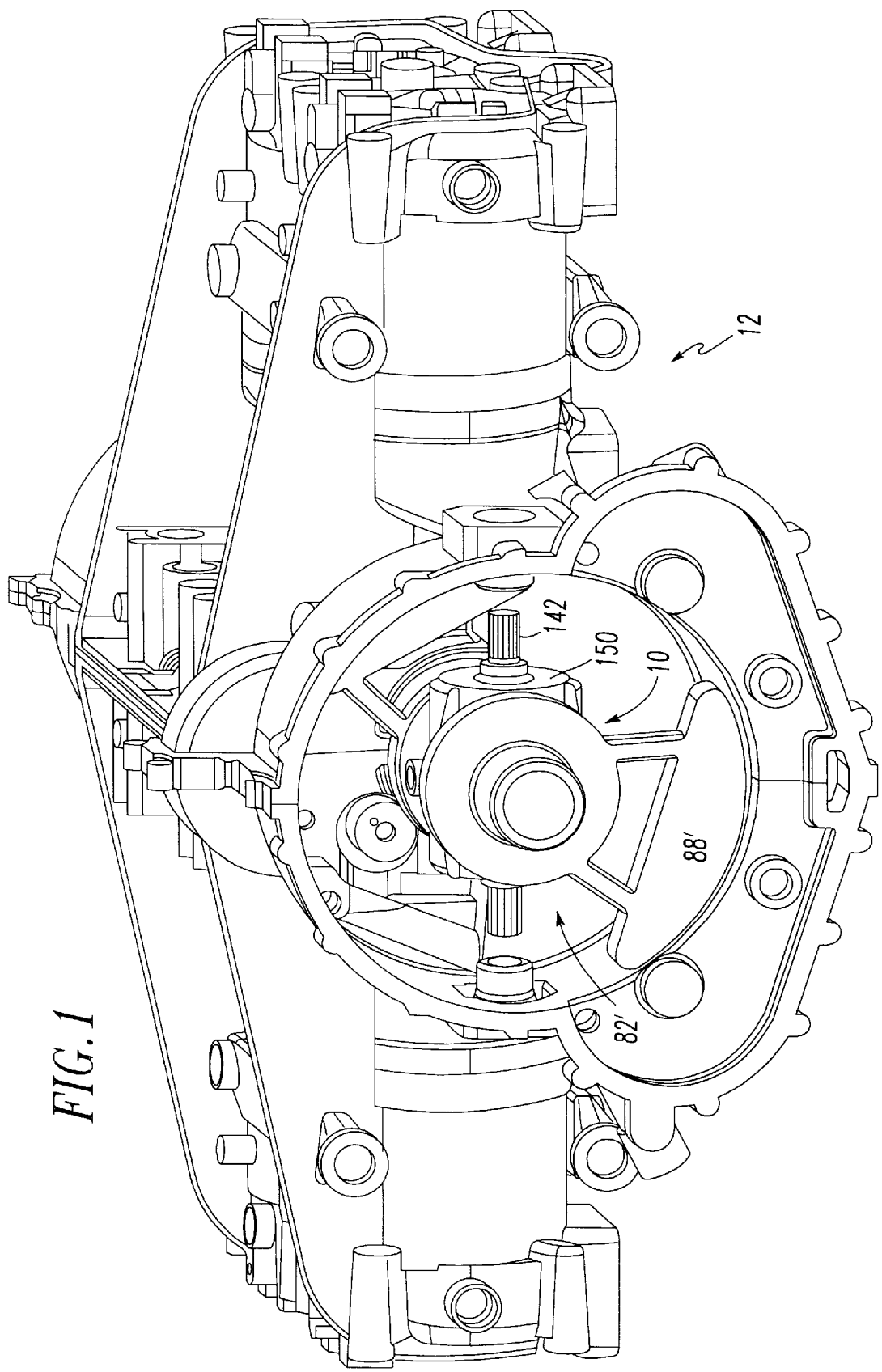
FIG. 1 is a perspective view of a four cylinder, two stroke, horizontally opposed engine with the balancing apparatus of the present invention installed therein.

Referring now to the drawings for the purposes of illustrating the present preferred embodiments of the invention only and not for the purposes of limiting the same there is shown an engine balance mechanism 10 that is adapted to be advantageously used to balance various internal forces generated in an engine 12. While the engine balance mechanisms 10 of the present invention are particularly well-suited for use in connection with horizontally opposed, four cylinder, two stroke aircraft engines of the type depicted in FIG. 1, the skilled artisan will appreciate that the subject invention may be advantageously employed in connection with a variety of other engines, such as, for example, two stroke engines with less than twelve cylinders and four stroke engines with less six cylinders. Moreover, the subject invention can work in as variety of different engine configurations used in, for example, automobiles, aircrafts, boats, stationary compressors, etc. It is conceivable that the subject invention could provide advantageous results in any engine employing a rotating shaft and reciprocating pistons. Thus, the scope of protection afforded to the subject invention should not be limited solely to engines of the type depicted in FIG. 1.

Figure 2:
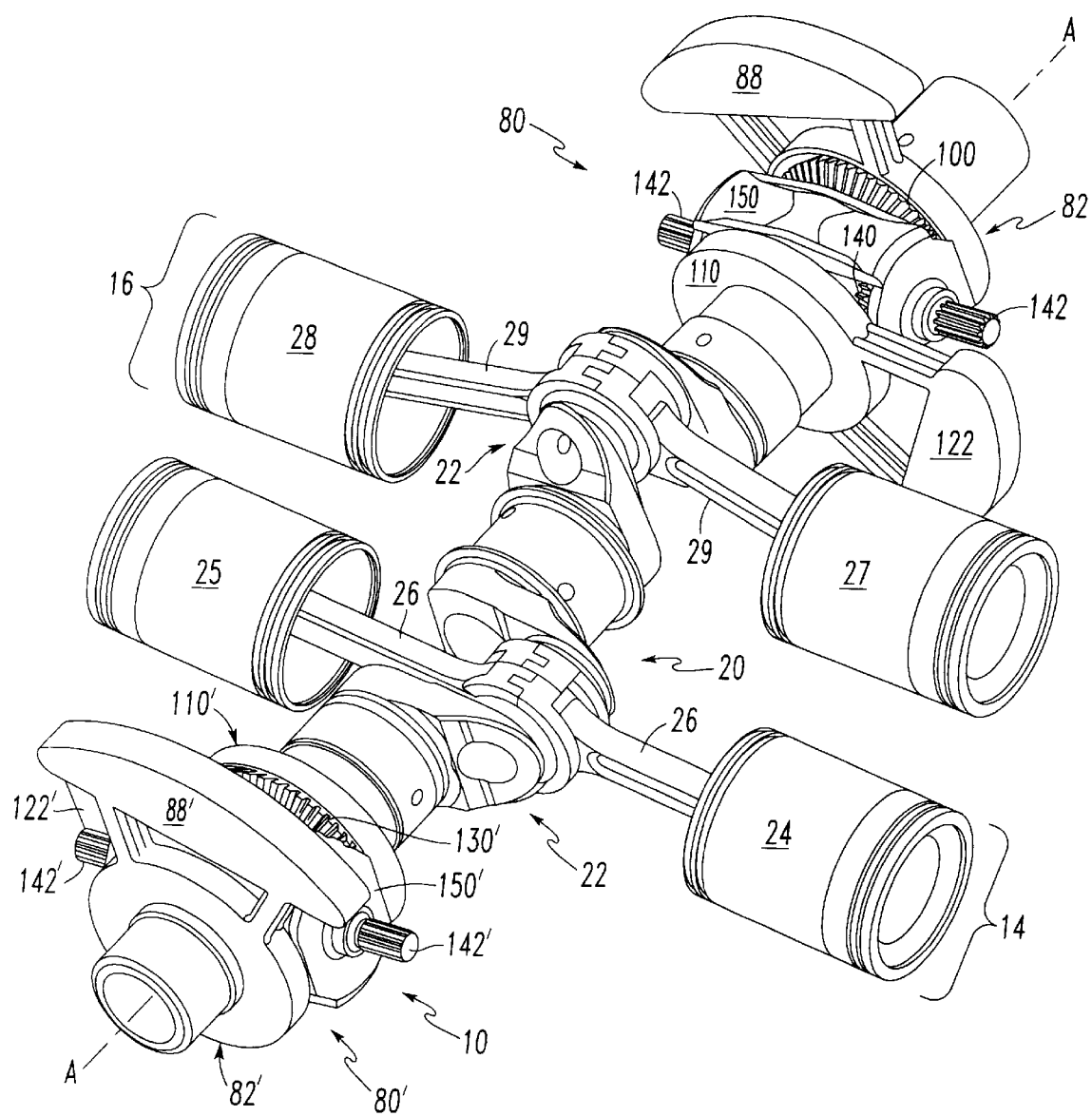
FIG. 2 is a perspective view of the balancing apparatus of the present invention attached to the crankshaft of the engine depicted in FIG. 1.

More particularly and with reference to FIG. 2, there is shown a preferred balance mechanism 10 of the present invention for use in connection with a crankshaft 20 of an engine 12. It will be understood that crankshaft 20 is rotatably supported within the engine 12 in a known manner for rotation about a crankshaft axis A—A. Crankshaft 20 may be machined, forged, or cast from steel or other suitable material in a configuration shown in FIGS. 3 and 4. In this embodiment, crankshaft 20 has two crankpins 22 that are radially offset from axis A—A. The skilled artisan will further understand that engine 12 has two "bays" (14, 16) of pistons. For the purposes of this description, the first bay 14 has a first piston 24 and a second piston 25. Pistons (24, 25) may be mechanically fastened to the corresponding crankpin 22 by conventional connecting rods 26. Likewise, the second bay 16 has a first piston 27 and a second piston 28 that are fastened to the corresponding crankpin 22 by conventional connecting rods 29. See FIG. 2. It will be understood that pistons (24, 25, 27, 28) lie in the same plane.

Crankshaft 20 further has a first end 30, a central portion 50 and a second end 60. The first end 30 may have a coaxially aligned lubrication passage 32 therethrough and a series of journal portions (34, 36, 38, 40) formed thereon. A radially extending lubrication port 35 may be provided through the journal portion 34 and another radially extending lubrication port 37 may be provided through the journal portion 36. Likewise, another radially extending lubrication port 41 may be provided through the journal 40.

Figure 3:
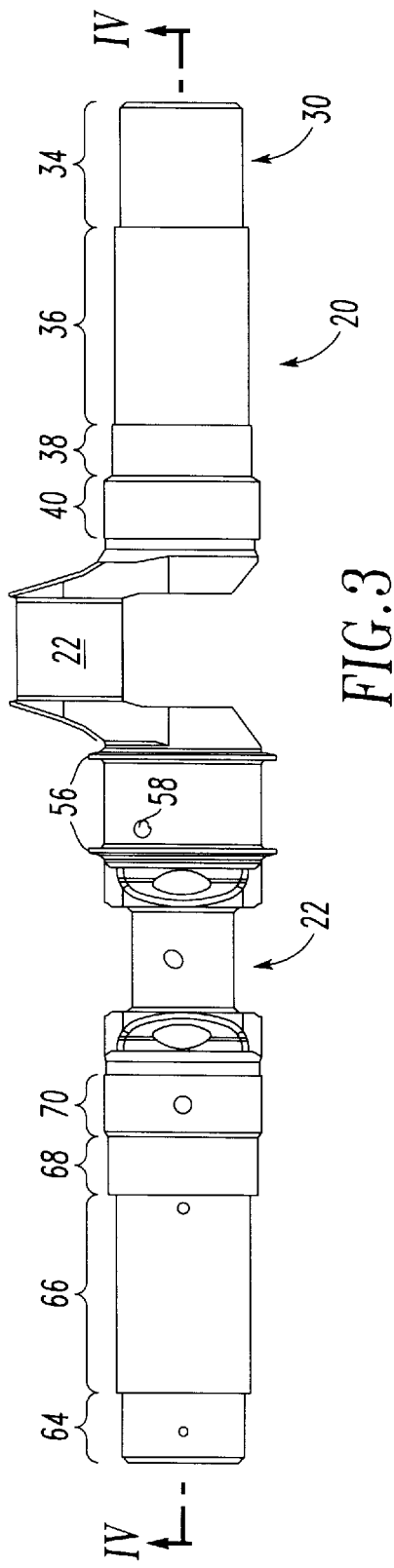
FIG. 3 is a side view of the crankshaft depicted in FIG. 2.
Figure 4:
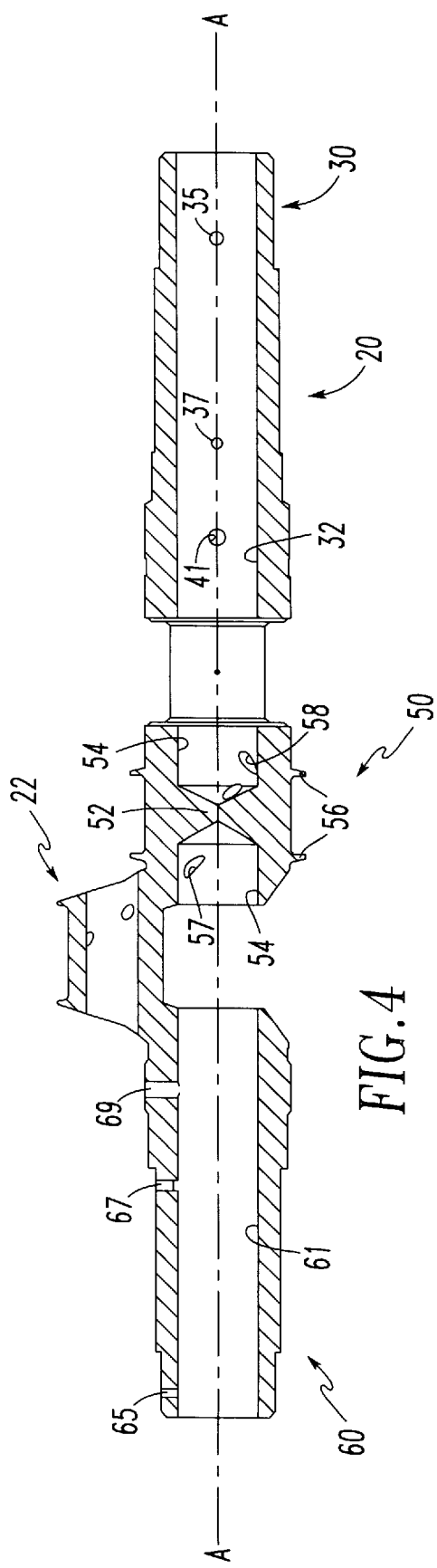
FIG. 4 is a cross-sectional view of the crankshaft of FIG. 3, taken along line IV—IV in FIG. 3.
Figure 5:
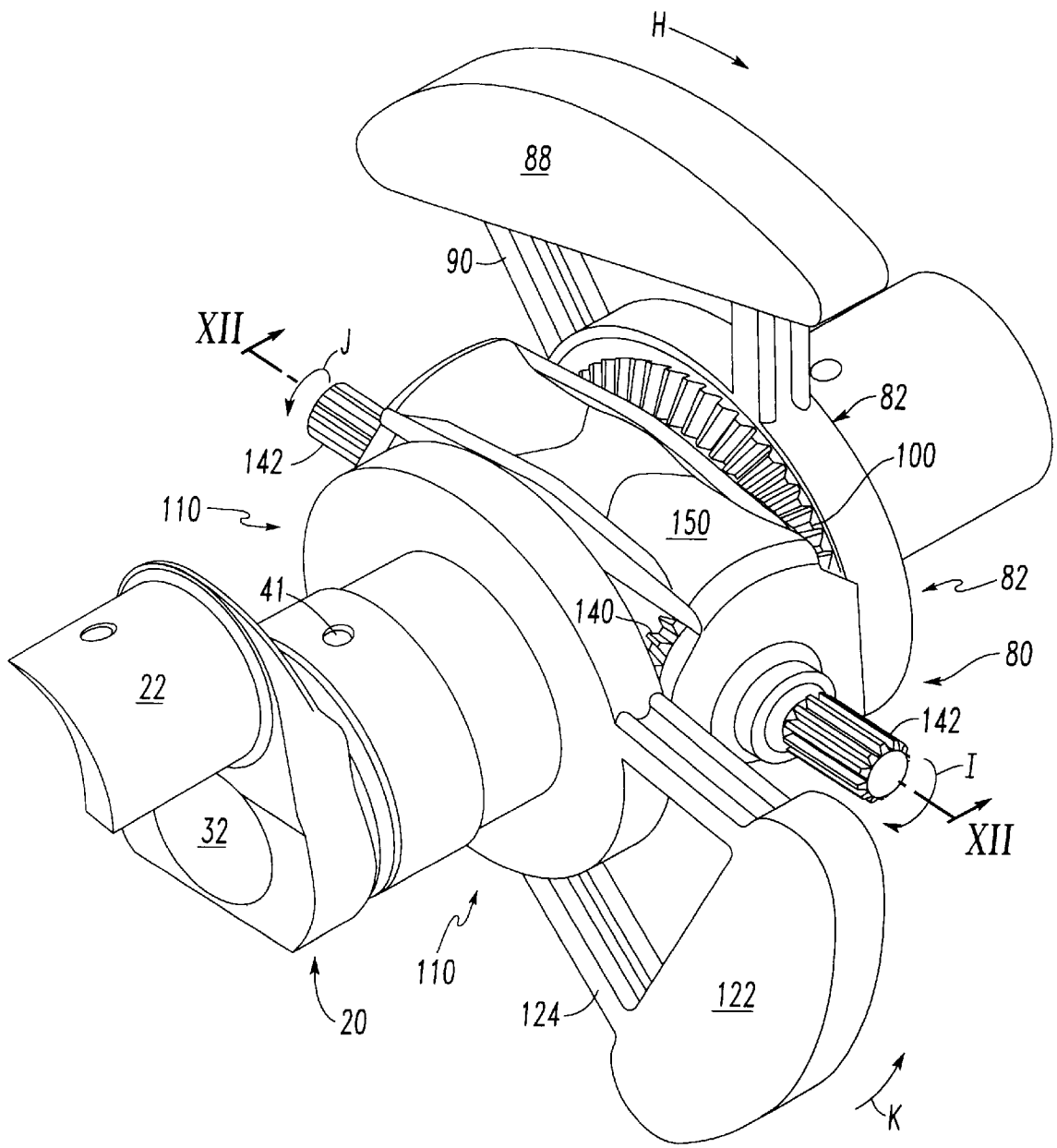
FIG. 5 is a partial perspective view of a drive assembly of the present invention attached to an end of a crankshaft.

As can be seen in FIG. 4, the central portion 50 may include a solid center area 52 and have two coaxially aligned bores 54 therein. Radial shoulders 56 may also be formed around the outer surface of the center portion 50. A first radially extending lubrication port 57 may be provided through the central portion 50 into the passage 32 and a second radially extending lubrication port 58 may be provided through the central portion 50 into a passage 62 within the second end 60. As can be seen in FIGS. 3 and 4, the second end 60 of crankshaft 20 may have a series of journals (64, 66, 68, 70) thereon and a lubrication passage 61 therethrough. In addition, a radially extending lubrication port 65 may be provided through journal 64 and another lubrication port 67 may be provided through the journal 66. Yet another radially extending lubrication port 69 may be provided through journal 70.

In the embodiment depicted in FIG. 2, an "aft" balance mass "driver" or drive assembly 80 and a "fore" balance mass driver assembly 80' are attached to the crankshaft 20. It will of course be understood that the aft drive assembly is attached in proximity to the rear end of the crankshaft and the "fore" drive assembly 80' is attached in proximity to the front end of the crankshaft. Those of ordinary skill in the art will appreciate, however, that the drive assemblies (80, 80') may be advantageously attached to any suitable point along the length of the crankshaft. The construction and operation of the aft drive assembly 80 will now be described. The reader will appreciate that the "fore" drive assembly 80' is preferably identical to the aft drive assembly 80 and, therefore, an appreciation of its construction and operation can be gleaned from the following discussion concerning the aft drive assembly 80. The elements of the fore drive assembly 80' are identical to the elements of the aft drive assembly 80. The elements of the fore drive assembly 80' will be identified in the drawings herein with the same element numbers describing the elements of the aft drive assembly 80 and with "'" symbol.

Figure 7:
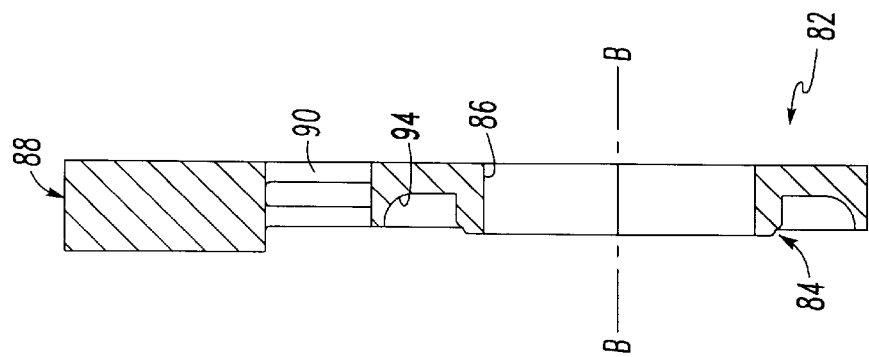
FIG. 7 is a cross-sectional view of the balance mass of FIG. 6, taken along line VII—VII in FIG. 6.
Figure 6:
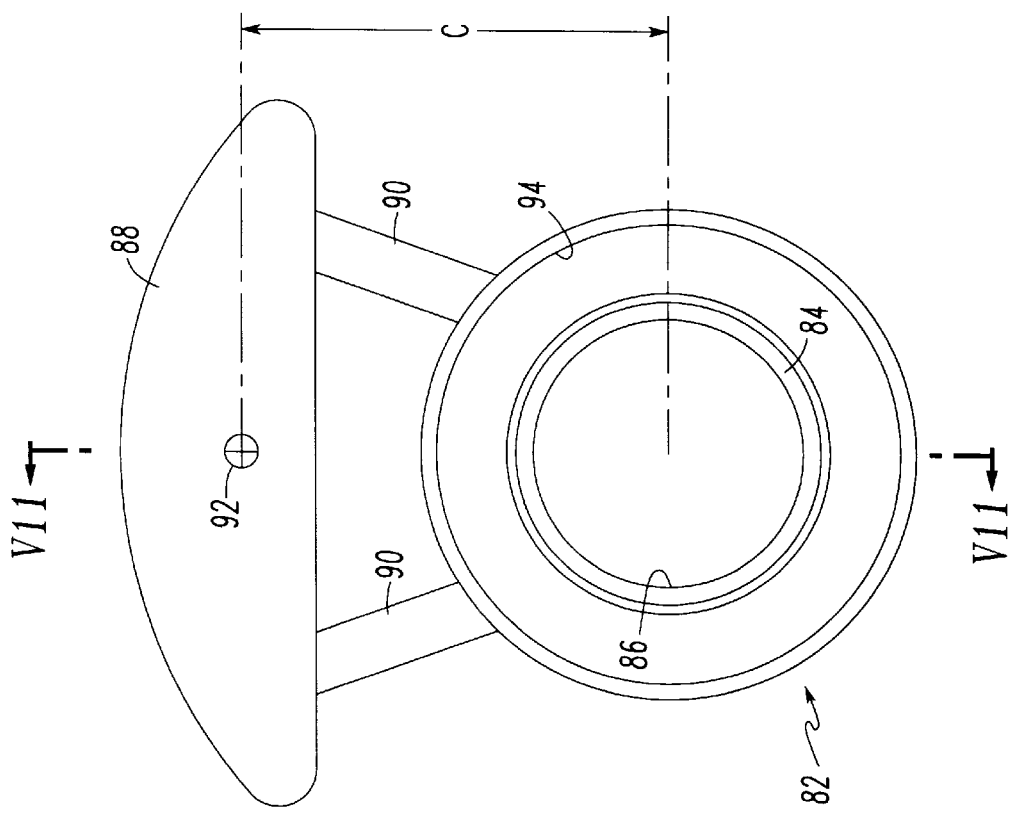
FIG. 6 is a side view of a first balance mass of the present invention.

The aft drive assembly 80 includes an aft "driver" balance assembly 82 that is non-rotatably affixed to the journal 36 of the crankshaft 20. An aft balance assembly 82 may be fabricated from steel or other suitable material and may include a hub portion 84 that has a hole 86 therethrough coaxially aligned on axis B—B. Hole 86 is sized to enable the hub portion 84 lo be coaxially pressed onto the journal 36 of the crankshaft 20. Those of ordinary skill in the art will appreciate that by pressing the hub 84 onto the journal 36, the aft balance assembly 82 will be non-rotatably affixed to the crankshaft 20. As can be seen in FIGS. 6 and 7, a first balance mass 88 is radially spaced apart from the hub 84 by arms 90. First balance mass 88 has a center of gravity (designated as 92 in FIG. 6) that is a predetermined distance "C" from the axis B—B (and axis A—A when the first balance assembly 82 is coaxially affixed to the journal 36 of the crankshaft 20). The hub 84, first balance mass 88, and arms 90 are preferably integrally formed from one piece of material. Those of ordinary skill in the art will also appreciate that the first balancing mass 88 may be provided in a variety of different shapes and weights. As can also be seen in FIGS. 6 and 7, the hub 84 has a cavity 94 therein for receiving a driver bevel gear (10. Driver gear 100 is preferably non-rotatably pressed onto the outer surface of the hub 84 and is partially received within the cavity 94. In the alternative, the driver gear 100 may be non-rotatably attached to the crankshaft 20.

Figure 8:
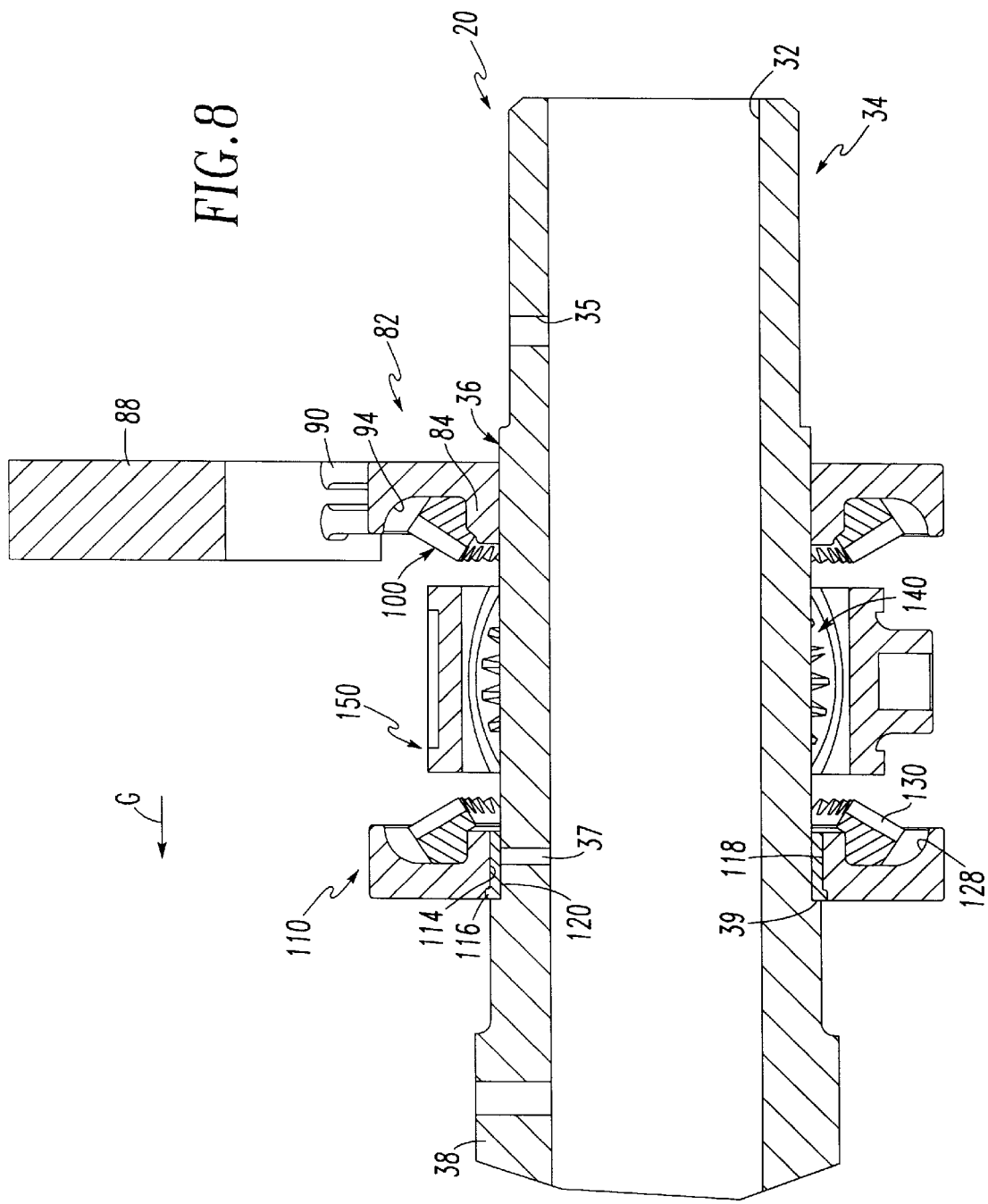
FIG. 8 is a cross-sectional exploded assembly view of a drive assembly of the present invention on a portion of a crankshaft.
Figure 10:
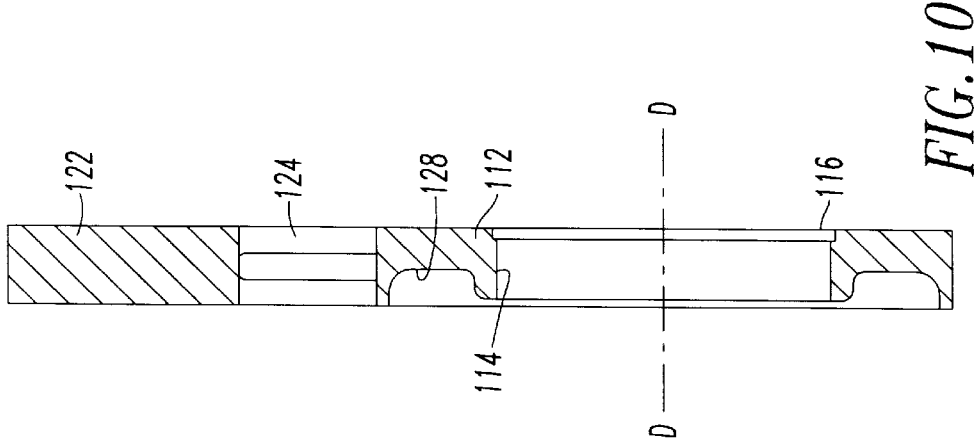
FIG. 10 is a cross-sectional view of the balance mass of FIG. 9, taken along line X—X in FIG. 9.
Figure 9:
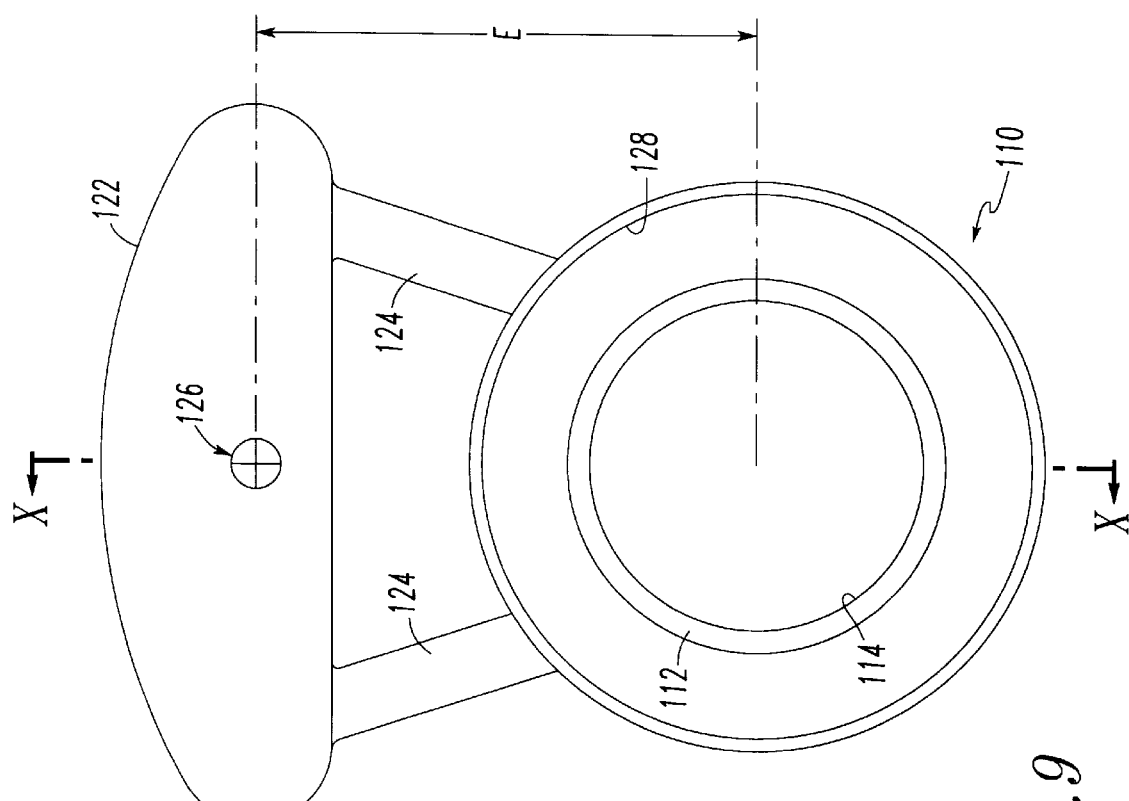
FIG. 9 is a side view of a second balance mass of the present invention.

A second balance assembly 110 is rotatably received on the journal 36 of the crankshaft 20. As shown in FIGS. 9 and 10, a second balance assembly 110 may comprise a hub member 112 that has an axial passage 114 therethrough aligned on axis D—D. In addition, hub 112 may have a coaxially aligned counterbore 116 therein for receiving the flanged portion 120 of a commercially available sleeve bearing 118. See FIG. 8. Sleeve bearing 118 may be pressed into the passage 114 and counterbore 116. The skilled artisan will appreciate that the sleeve bearing 118 serves to rotatably support the second balance assembly 110 on the journal 36 for rotation therearound. To further facilitate rotation of the sleeve bearing 118 on the journal 36, the radially extending lubrication passage 37 is preferably aligned with the sleeve bearing 118 as shown in FIG. 8, to deliver lubrication medium (i.e., crankcase oil) between the sleeve bearing 118 and the journal 36. A second balance mass 122 is radially affixed to the hub 112 by arms 124 that support the balance mass 122 apart from hub 112. The second balance mass 122 has a center of gravity (designated as 126 in FIG. 9) that is a predetermined distance "E" from the axis D—D (and axis A—A when the balance assembly 110 is coaxially supported on the journal 36 of the crankshaft 20). The hub 112, balance arms 124, and the balance mass 122 are preferably integrally formed from one piece of material. Those of ordinary skill in the art will appreciate that the balance mass 122 may be provided in a variety of different shapes and weights. As can also be seen in FIGS. 8–10, the second balance arm 124 also preferably has a coaxial cavity 128 therein for receiving a second driven gear 130. Second driven gear 130 preferably comprises a bevel gear that is adapted to be non-rotatably affixed to the second balance assembly 110. In a preferred embodiment, the second driven gear 130 is pressed onto the hub 112 of the second balance assembly 110 as shown in FIG. 7.

In this embodiment, the first and second gears (100, 130) are intermeshed with at least one, and preferably two, auxiliary bevel gears 140 in a one-to-one ratio such that balance masses 88 and 122 rotate at the same speed, but in different directions. Thus, in this embodiment, gears (100, 130, 140) are sized such that gear 130 will rotate at substantially the same speed as gear 100, except that gear 130 will rotate in an opposite direction. As the present Detailed Description proceeds, however, the skilled artisan will appreciate that the speeds of the balance masses (80, 122) are preferably in direct multiples of the rotational speed of the crankshaft. For example, to cancel out second order forces, it may be desirable to rotate the balance masses at twice the speed of the crankshaft.

Figure 11:
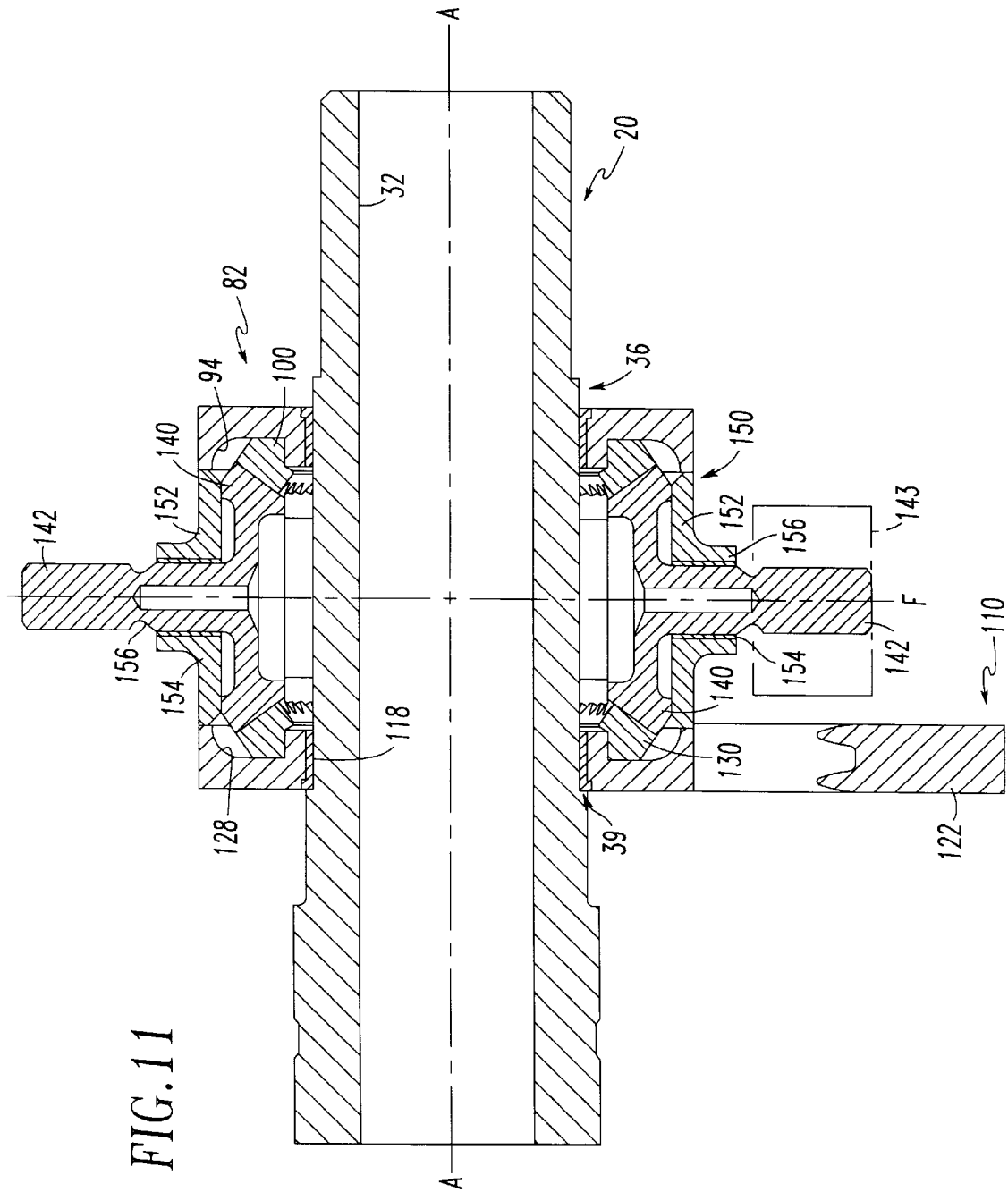
FIG. 11 is another cross-sectional view of a drive assembly of the present invention attached to a portion of a crankshaft.
Figure 12:
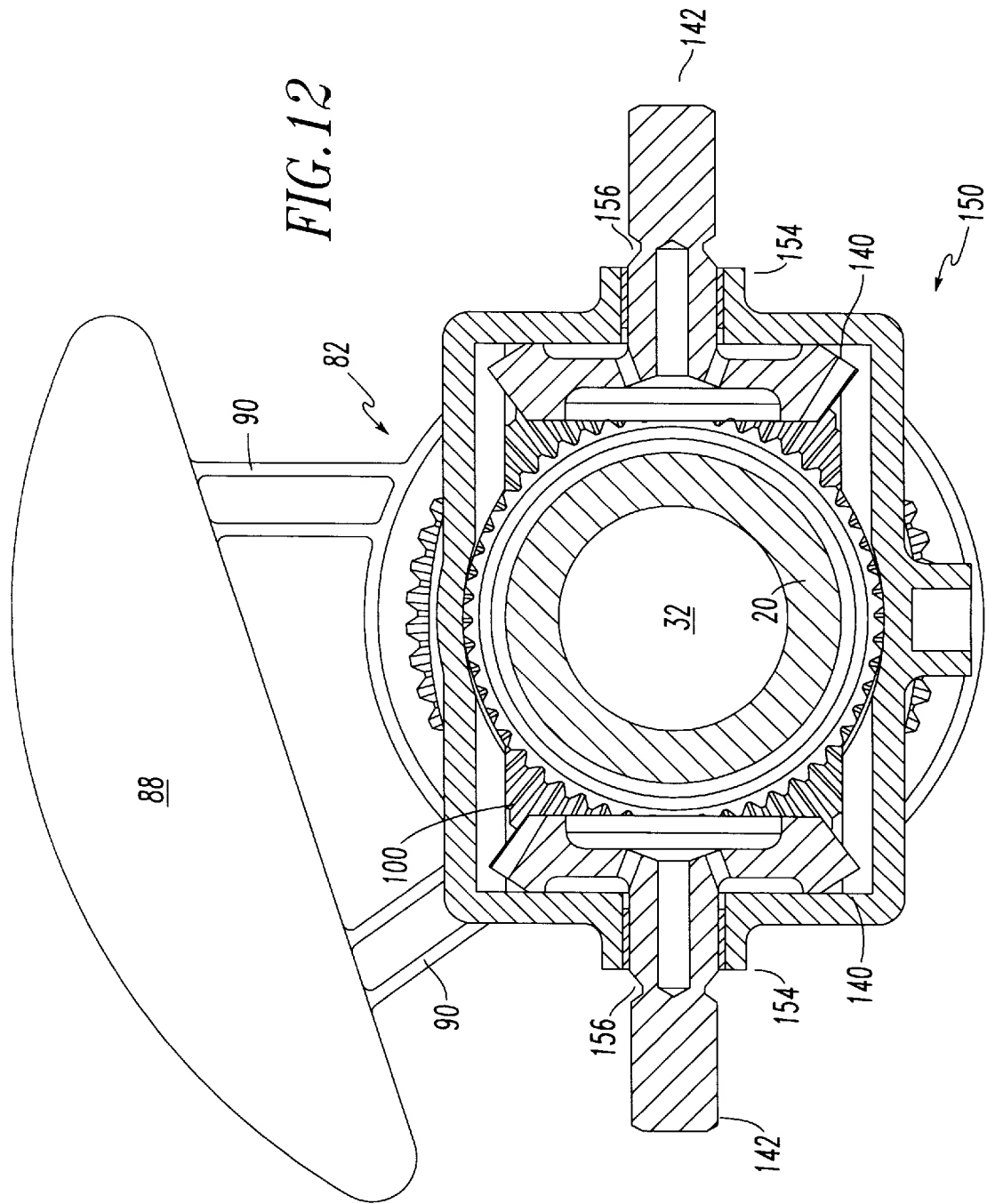
FIG. 12 is a cross-sectional view of the drive assembly and crankshaft of FIG. 5 taken along line XII—XII in FIG. 5.
Figure 13:
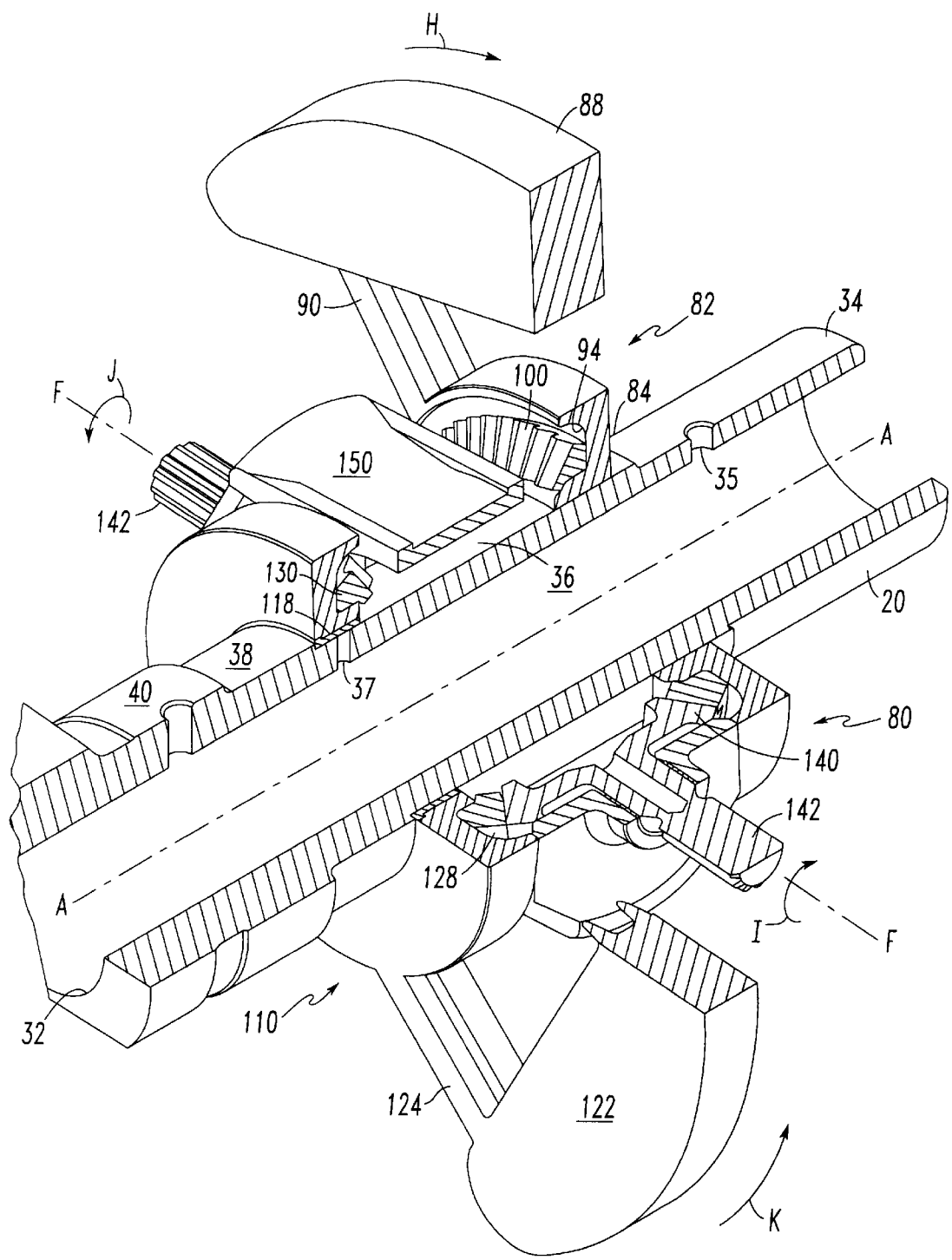
FIG. 13 is a partial cross-sectional view of the drive assembly and crankshaft of FIG. 5.
Figure 14:
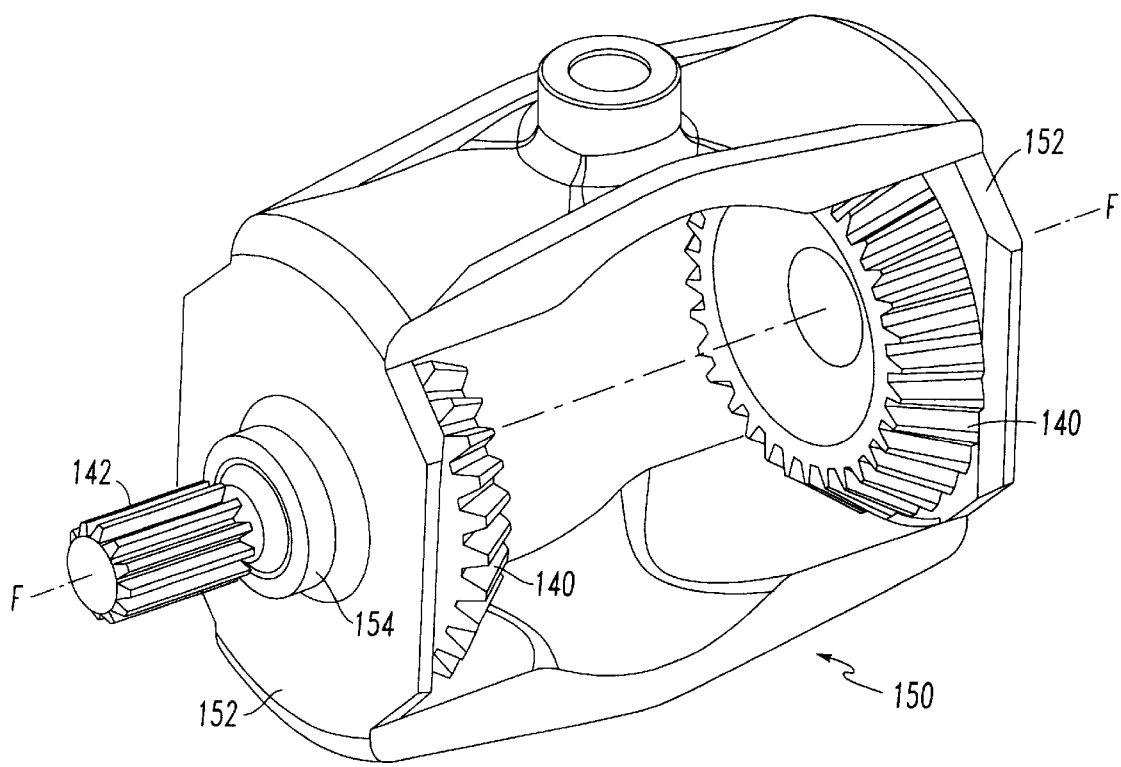
FIG. 14 is a perspective view of a gear cage assembly of the present invention.

As can be seen in FIGS. 11—13, the auxiliary bevel gears 140 are retained between the first and second gears (110, 130) in intermeshing engagement therewith by a gear cage assembly 150. Gear cage assembly 150 is preferably fabricated from steel or other suitable material and has two end portions 152 that are each adapted to rotatably support a corresponding auxiliary gear along a common axis F—F as shown in FIG. 14. A commercially available bearing 156 may be pressed into the outwardly protruding shoulder portions 154 formed on each end of the gear cage assembly 150 to facilitate rotatable support of the auxiliary bevel gears 140 relative to the gear cage assembly 150. Gear cage assembly 150 is also preferably configured to rotatably receive a portion of the crankshaft 20 therein such that the axis F—F is substantially transverse to the crankshaft axis A—A. See FIG. 11.

The subject drive assembly 80 can also be most advantageously used to harness rotational power from the rotating crankshaft 20 and use that power to drive various auxiliary devices, such as, hydraulic pumps, vacuum pumps, etc. (shown in phantom lines in FIG. 11 as 143). This may be accomplished by providing a splined shaft 142 on each auxiliary gear 140. The skilled artisan will appreciate that the splined shaft 142 enables the auxiliary gears 140 to be coupled to other auxiliary devices 143 in a conventional manner. It will be further appreciated, however, that other methods of coupling the auxiliary gears 140 to an auxiliary device 143 may be successfully employed. Those of ordinary skill in the art will also understand that the drive assembly 80 may also be fabricated with only one auxiliary gear 140.

The installation of a drive assembly 80 onto the crankshaft 20 will now be described. Referring to FIGS. 8 and 11, the second balance assembly 110 is slidably inserted onto the journal portion 36 of the crankshaft 20 until it contacts the shoulder 39 of journal portion 36. Thereafter, the gear cage assembly 150, with the auxiliary gears 140 installed therein, is also slid onto the journal portion 36 of the crankshaft 20 until the auxiliary gears 140 intermesh with the second bevel gear 130. The first balance assembly 82 is then pressed onto the journal portion 36 of the crankshaft 20 so that the first bevel gear 100 intermeshes with the auxiliary gears 140 to achieve a desired angular orientation of the balance masses 88 and 122 with respect to each other. See FIG. 17. Thus, the second balance assembly 110 is prevented from "walking" in the "G" direction by the shoulder 39 and the first balance assembly 82, by virtue of the first balance assembly 82 being affixed to the crankshaft 20, and thereby retaining gears (100, 140, 130) in intermeshing engagement. See FIG. 11.

The operation of the drive assembly 80 will now be described. As the crankshaft 20 rotates in a clockwise direction (represented by arrow "H" in FIG. 13), the first gear 100 also rotates in that direction by virtue of being non-rotatably affixed to the crankshaft 20. As the first gear 100 rotates, it causes the auxiliary gears 140 to rotate about axis F—F in the directions represented by arrows "I" and "J". The auxiliary gears 140, by virtue of their intermeshing engagement with the second bevel gear 130, causes the second balance assembly 110 (and the balance mass 122) to rotate in the counterclockwise direction (represented by arrow "K" in FIG. 13) at substantially the same speed as the crankshaft 20.

Figure 15:
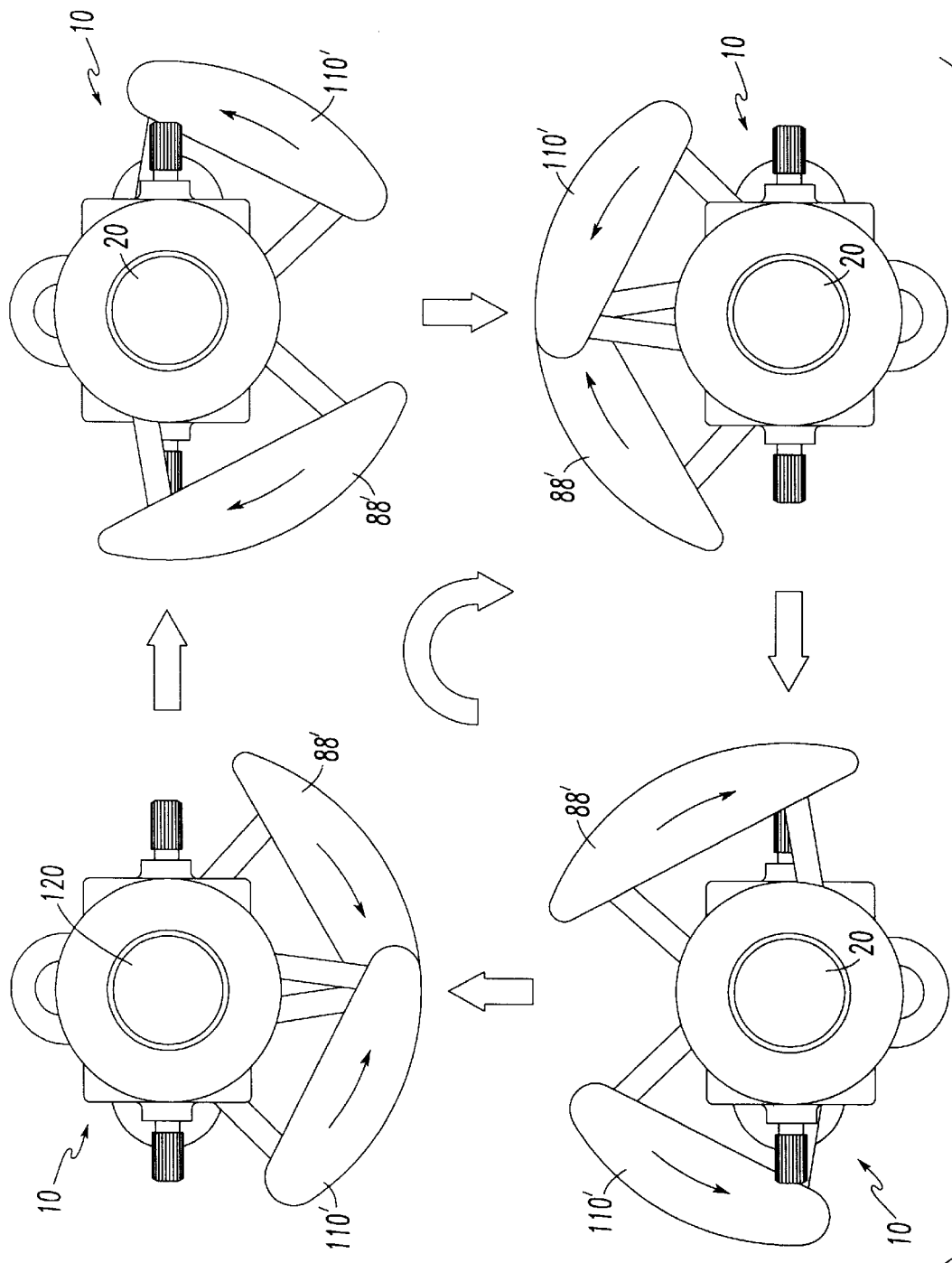
FIG. 15 is a collection of front end views of a rotating crankshaft having the balancing apparatus of the present invention attached thereto.

FIG. 15 illustrates the rotation of the balance masses (88', 110') of the present invention attached to the crankshaft 20. The engine with its 90° firing order has a primary shaking force and couple unbalanced based on the weight of the pistons and connecting rods, etc. as they move back and forth in the cylinder. That is, the engine shakes from side to side while it twists on its mounts in with a frequency equal to its engine speed. As the balance masses of the present invention rotate, they add and subtract from each other. This relationship may be gleaned from reference to FIG. 15.

The present balance mechanism is a compact and relatively lightweight means of countering the inertia force unbalance which is inherent in "even fire" two stroke engines with less than 12 cylinders and even fire four stroke engines with less than six cylinders. The skilled artisan will appreciate that the horizontally opposed, four cylinder, two stroke engine shown in FIG. 1 has an inherent primary force and couple unbalance. Such directly opposed engine, however, internally balances all secondary and higher inertia forces. Therefore, additional balancing apparatuses are generally not employed in such engines to counter such higher order forces. The subject invention balances the primary forces, primary couples and also the rotating unbalance of the crankshaft and connecting rods.

As described herein, the balance mass drive assemblies of the present invention are preferably coaxially affixed adjacent each end of the crankshaft. However, the drive assemblies may be positioned at other positions on the crankshaft. The balance masses that are essentially fixed to the crankshaft have a "total mass moment" (their mass times the radius of rotation of the balance mass center of gravity—i.e., distances "C" and "E") that is approximately equal to the rotating unbalance of the crankshaft and the connecting rods plus one half of the total reciprocating inertia times the crank radius. It will be understood that the "reciprocating inertia" is the mass of the pistons, rings, piston pins, oil entrained within the piston and other masses attached to the piston plus the effective reciprocating inertia of the connecting rod. The reciprocating inertia is generally approximated as one third the connecting rod weight. However, it will be appreciated by the skilled artisan that the reciprocating inertia may be more precisely determined by mathematical distribution of the connecting rod mass and moment of inertia to the effective crankpin and small end centers. In a preferred embodiment, the counter-rotating balance masses have a balance moment of approximately one half the reciprocating inertia times the crank radius. The precise mass-moment for the balancing masses may be calculated from the reciprocating inertia, the rotating mass moment, and the positioning of the balance masses on the crankshaft by using the equations set forth below.

In a preferred embodiment, the first balance masses are attached to the crankshaft in a desired position and the counter rotating balance masses are geared to the crankshaft in a desired timing scheme such that the mass moments add to each other to counteract and effectively cancel the reciprocating inertia of the pistons and associated parts in the plane of the cylinders. The timing and placement of the balance masses are arranged such that the forces of the balance masses counteract and effectively cancel each other in a plane perpendicular to the cylinders. The skilled artisan will also appreciate that, with the above-mentioned parameters in mind, the balance masses may also be advantageously positioned on the crankshaft to effectively cancel the inherent unbalanced couple of the reciprocating pistons.

Those of ordinary skill in the art will appreciate that the following empirical equations may be used in a known manner to calculate the various parameters described above. Such equations can be particularly advantageous in calculating such parameters for a four cylinder horizontally opposed, even fire, two stroke engine with two crank pins. The following equations are provided herein to illustrate the mechanics of the present invention which can be successfully applied to a variety of engine configurations.

Four Cylinder Opposed Engine Balance Analysis:
Glossary of terms:

R=crank radius
ω=crankshaft velocity (radians/second)
θ=crankshaft angle from reference number one top center
L=connecting rod length (center of crankpin to center of pin radius)
m=mass of piston and connection rod small end 1. Unbalanced Reciprocating Forces Piston Acceleration in one bay of an opposed engine:

$$\frac{D_2 S}{Dt_2} = \omega^2 R(\cos(\theta) + 4a_2\cos 2\theta + 16a_4\cos 4\theta + 36a_6\cos 6\theta + \ldots)$$

Where:

$$a_2 = \frac{L}{R}\left[\frac{1}{4}\left(\frac{R}{L}\right)^2 + \frac{1}{16}\left(\frac{R}{L}\right)^4 + \frac{15}{512}\left(\frac{R}{L}\right)^6 + \ldots\right]$$

$$a_4 = -\frac{L}{R}\left[\frac{1}{64}\left(\frac{R}{L}\right)^4 + \frac{3}{256}\left(\frac{R}{L}\right)^6 + \ldots\right]$$

$$a_6 = \frac{L}{R}\left[\frac{1}{512}\left(\frac{R}{L}\right)^6 + \ldots\right]$$

Piston #1 (Piston #24):

$$\frac{D^2 S}{Dt^2} = \omega^2 R(\cos\alpha + 4a_2\cos 2\alpha + 16a_4\cos 4\alpha + 36a_6\cos 6\alpha + \ldots)$$

Piston #2 (Piston 25):

$$\frac{D^2 S}{Dt^2} = \omega^2 R[\cos(\alpha + \pi) + 4a_2\cos(2\alpha + 2\pi) +$$
$$16a_4\cos(4\alpha + 4\pi) + 36a_6\cos(6\alpha + 6\pi) + \ldots)$$
$$= \omega^2 R[-\cos\alpha + 4a_2\cos 2\alpha + 16a_4\cos 4\alpha + 36a_6\cos 6\alpha + \ldots)$$

The combined reciprocating force for #1 crank (#1 piston (i.e., Piston 24) and #2 piston (i.e., Piston 25)):

$$\frac{D^2 S}{Dt^2} = \omega^2 R(\cos\alpha + 4a_2\cos 2\alpha + 16a_4\cos 4\alpha + 36a_6\cos 6\alpha + \ldots) -$$
$$\omega^2 R[-\cos\alpha + 4a_2\cos 2\alpha + 16a_4\cos 4\alpha + 36a_6\cos 6\alpha + \ldots)$$
$$= 2\omega^2 R\cos\alpha$$

This result shows that an opposed cylinder engine has only a first order reciprocating force on each crank. The secondary and higher orders are counteracted by the opposing cylinder. The unbalanced reciprocating force derived above can be represented by a rotating mass vector projected onto the cylinder plane. This rotating vector has a mass moment of $2w^2 R_0 m_0$ and is aligned with the cylinder centerline and rotates with the crankshaft.

2. Total reciprocating force for the combined crank #1 and crank #2:

Reciprocating force on crankpin #1:

$$F^1 = M_0 * \frac{D^2 S}{Dt^2}\bigg|_{crank\#1} = 2m_0 * \omega^2 R_0 \cos\alpha$$

Reciprocating force on crankpin #2:

$$F_2 = m_0 * \frac{D^2 S}{Dt^2}\bigg|_{crank\#2} = 2m_0 * \omega^2 R_0 \cos(\alpha - \pi) = 2m_0 * \omega^2 R_0 \sin\alpha$$

Combining these two equations gives the total reciprocating force unbalance:

$$F_r = F_1 + F_2 = 2m_0 R_0 * \omega^2 \cos\alpha + 2m_0 R_0 * \omega^2 \sin\alpha = 2m_0 R_0 * \omega^2[\cos\alpha + \sin\alpha]$$

$$= 2m_0 R_0 * \omega^2 * \sqrt{2}\left[\cos\alpha\cos\frac{\pi}{4} + \sin\alpha\sin\frac{\pi}{4}\right] = 2\sqrt{2}\, m_0 R_0 \omega^2 \left[\cos\left(\alpha - \frac{\pi}{4}\right)\right]$$

3. Total combined reciprocating-induced couple for crankpin #1 and crankpin #2:

$$C_r = C_1 - C_2 + \frac{L_0}{2} 2m_0 R_0 * \omega^2 [\cos\alpha - \sin\alpha]$$

$$= L_0 m_0 R_0 * \omega^2 \sqrt{2}\left[\cos\alpha\cos\frac{\pi}{4} - \sin\alpha\sin\frac{\pi}{4}\right]$$

$$= \sqrt{2}\, L_0 m_0 R_0 * \omega^2 \left[\cos\left(\alpha + \frac{\pi}{4}\right)\right]$$

4. Balance masses to balance the reciprocating force:
Forward balance mass fixed to the crankshaft:

$$f_{11} = m_b R_b * \omega^2 \cos(\alpha + \pi - \pi/4) = -m_b R_b * \omega^2 \cos(\alpha - \pi/4)$$

Forward balance mass counter rotating to the crankshaft:

$$f_{12} = m_b R_b * \omega^2 \cos(-\alpha + \pi + \pi/4) = m_b R_b * \omega^2 \cos[-(\alpha - \pi - \pi/4]$$

$$= -m_b R_b * \omega^2 \cos(\alpha - \pi/4)$$

Rear balance mass fixed to the crankshaft:

$$f_{21} = m_b R_b * \omega^2 \cos(\alpha + \pi - \pi/4 = -m_b R_b * \omega^2 \cos(\alpha - \pi/4)$$

Rear balance mass counter rotating to the crankshaft:

$$f_{22} = m_b R_b * \omega^2 \cos(-\alpha + \pi + \pi/4) = m_b R_b * \omega^2 \cos[-(\alpha - \pi - \pi/4)]$$

$$= -m_b R_b * \omega^2 \cos(\alpha - \pi/4)$$

The total force generated by those four rotating balance masses will be:

$$F_b = \sum_{i,j=1}^{2} f_{ij} = -4 * m_b R_b * \omega^2 \cos(\alpha - \pi/4)$$

To balance the reciprocating force set:

$$F_b + F_r = 0$$

i.e.

$$4 * m_b R_b * \omega^2 \cos(\alpha - \pi/4) - 2\sqrt{2} * m_0 R_0 * \omega^2 \cos(\alpha - \pi/4) = 0$$

Therefore:

$$m_b R_b = \sqrt{2}/2 * m_0 R_0 = 0.7071 * m_0 R_0$$

5. Balance mass to balance the reciprocating force induced couple:
Forward balance mass fixed to the crankshaft:

$$c_{11} = L_c m_c R_b * \omega^2 \cos(\alpha + \pi + \pi/4) = -L_c m_c R_b * \omega^2 \cos(\alpha + \pi/4)$$

Forward balance mass counter-rotating to the crankshaft:

$$c_{12} = L_c m_c R_b * \omega^2 \cos(-\alpha + \pi - \pi/4) = -L_c m_c R_b * \omega^2 \cos(\alpha + \pi/4)$$

Rear balance mass fixed to the crankshaft:

$$c_{21} = L_c m_c R_b * \omega^2 \cos(\alpha + \pi/4)$$

Rear balance mass counter-rotating to the crankshaft:

$$c_{22} = L_c m_c R_b * \omega^2 \cos(-\alpha - \pi/4) = L_c m_c R_b * \omega^2 \cos(\alpha + \pi/4)$$

The total couple generated by those four rotating balance masses will be:

$$c_b = \sum_{i=1}^{2} C_{1i} - \sum_{i=1}^{2} c_{2i} = -4 * L_c m_c R_b * \omega^2 \cos(\alpha + \pi/4)$$

To balance those reciprocating-induced couples, set:

$$C_b + C_r = 0$$

i.e.

$$4 * L_c M_c R_b * \omega^2 \cos(\alpha + \pi/4) - \sqrt{2} * L_0 m_0 R_0 * \omega^2 \cos(\alpha + \pi/4) = 0$$

Therefore:

$$m_c R_b = \sqrt{2}/4 * \frac{L_0}{L_c} m_0 R_0$$

6. Combined four-piece rotating masses to balance the reciprocating force and couple:
Set $m_\tau$ to be the mass either fixed to the crankshaft or counter-rotating to the crankshaft each with an arm length of $R_b$. These masses are to balance both the reciprocating inertia force and couple.

$$m_\tau R_b = \sqrt{(m_b R_b)^2 + (m_c R_b)^2} = \sqrt{\left(\left(\sqrt{2}/2 * m_0 R_0\right)^2 + 0.3536 * L_0/L_C * m_0 R_0\right)^2}$$

To calculate the angle between the vector of this mass with that of the $m_b R_b$:

$$\phi = \tan^{-1}\frac{m_c R_b}{m_b R_b} = \tan^{-1}\frac{0.3536 * L_0/L_c * m_0 R_0}{\sqrt{2}/2 * m_0 R_0} = \tan^{-1}(0.5 * L_0/L_c)$$

7. Rotating masses fixed to crankshaft to balance the piston induced rotating force and couple:

Centrifugal force for the first crank:

$$F_{r1} = m_\tau R_0 * \omega^2 \cos\alpha$$

Setting two pieces of rotating mass fixed to the crankshaft to balance both the force and couple, the forces generated by those two masses must satisfy:

Force balance:

$$f_{b11} + f_{b21} = F_{r1}$$

And couple balance:

$$f_{b11} L_1 + f_{b21} L_2$$

Therefore:

$$f_{b11} = F_{r1} * \frac{L_2}{L_1 + L_2}$$

$$f_{b21} = F_{r1} * \frac{L_1}{L_1 + L_2}$$

Considering:

$$F_i = m_i R_i * \omega^2 \cos\alpha$$

There is:

$$m_{b11} = \frac{R_0}{R_b} * \frac{L_2}{L_1 - L_2} m_r$$

$$m_{b21} = \frac{R_0}{R_b} * \frac{L_1}{L_1 - L_2} m_r$$

By the same reasoning, the following equations can be derived for the second crankpin:

$$m_{b12} = \frac{R_0}{R_b} * \frac{L_1}{L_1 + L_2} m_r$$

$$m_{b22} = \frac{R_0}{R_b} * \frac{L_2}{L_1 + L_2} m_r$$

To combine the two fixed reciprocating balance masses and the two fixed rotating unbalance masses into just two masses:

$$m_{b1}R_b = \sqrt{m_{b11}^2 + m_{b12}^2} =$$

$$m_r R_0 * \frac{\sqrt{-L_1^2 + L_2^2}}{L_1 + L_2} = m_r R_0 * \frac{\sqrt{(L_C - 0.5*L_0)^2 - (L_C + 0.5*L_0)^2}}{(L_C - 0.5*L_0) + (L_C + 0.5*L_0)} =$$

$$\sqrt{0.5 + 0.125 * (L_0 / L_c)^2} * m_r R_0$$

$$m_{b2}R_b = \sqrt{m_{b21}^2 + m_{b22}^2} = m_r R_0 * \frac{\sqrt{L_1^2 + L_2^2}}{L_1 + L_2} =$$

$$\sqrt{0.5 + 0.125 * (L_0 / L_c)^2} * m_r R_0$$

The vector angle of these forces to that of the $(-F_{ri})$ is:

$$\phi_{rot} = \tan^{-1} \frac{m_{b12}}{m_{b11}} = \tan^{-1} \frac{L_1}{L_2} = \tan^{-1} \frac{L_c - 0.5 * L_0}{L_c + 0.5 * L_0}$$

Figure 16:
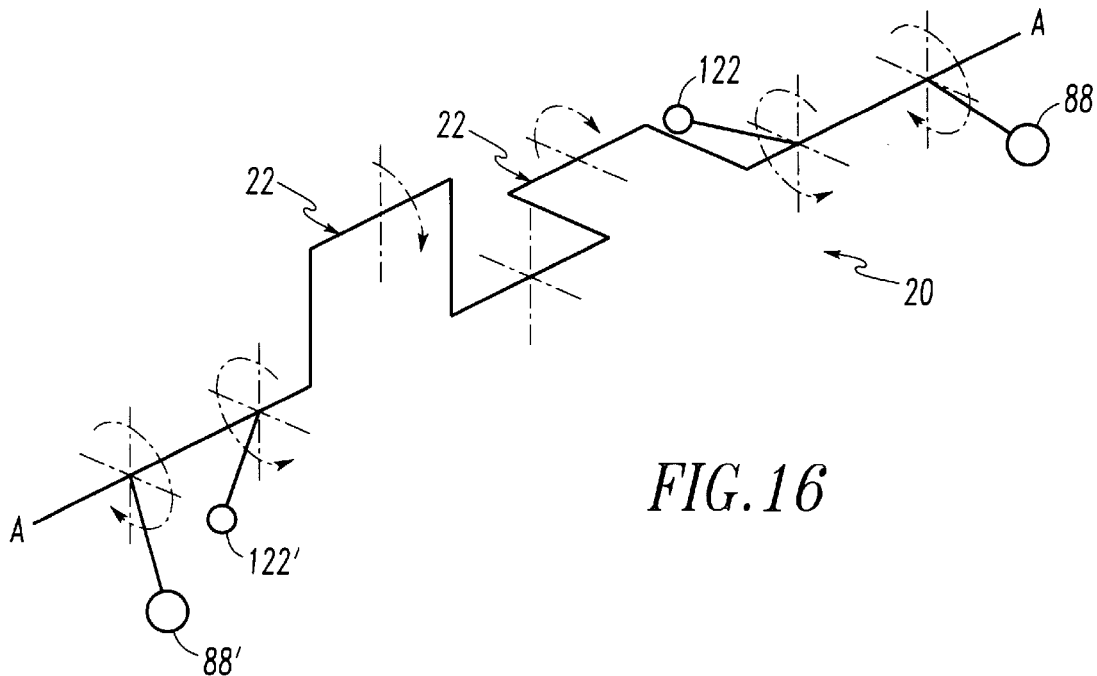
FIG. 16 is a graphical depiction of the positioning of the balance masses of the present invention along a rotating crankshaft.
Figure 17:
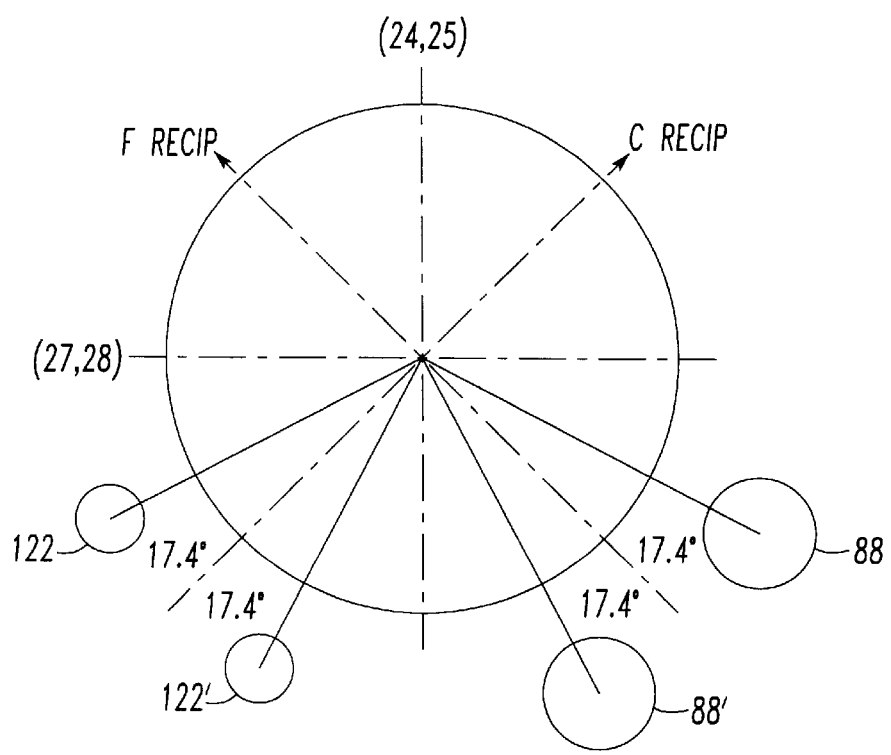
FIG. 17 is another graphical depiction of the instantaneous positions of the balance masses of the present invention about a rotating crankshaft axis.

FIGS. 16 and 17 are graphical depictions of a crankshaft illustrating the positions of the balance masses for the embodiment described above. As can be seen in those Figures, the pistons (24, 25) in the first bank 14 are arranged about axis A—A at 90° relative to each other. FIG. 17 is an instantaneous snap shot of the rear crank throw when the pistons are at "top dead center". The total reciprocating forces "F Recip." are located at an approximately 45° angle between the pistons (24, 25) and (27, 28). Likewise, the total reciprocating couple force "C Recip." is located 90° from the F Recip. The balance masses (88 and 88') that are affixed to the crankshaft are located approximately 17.4° on each side of the force vector of F Recip. Similarly, the counter rotating balance masses (122, 122') are located approximately 17.4° on each side of the force vector C Recip.

Figure 18:
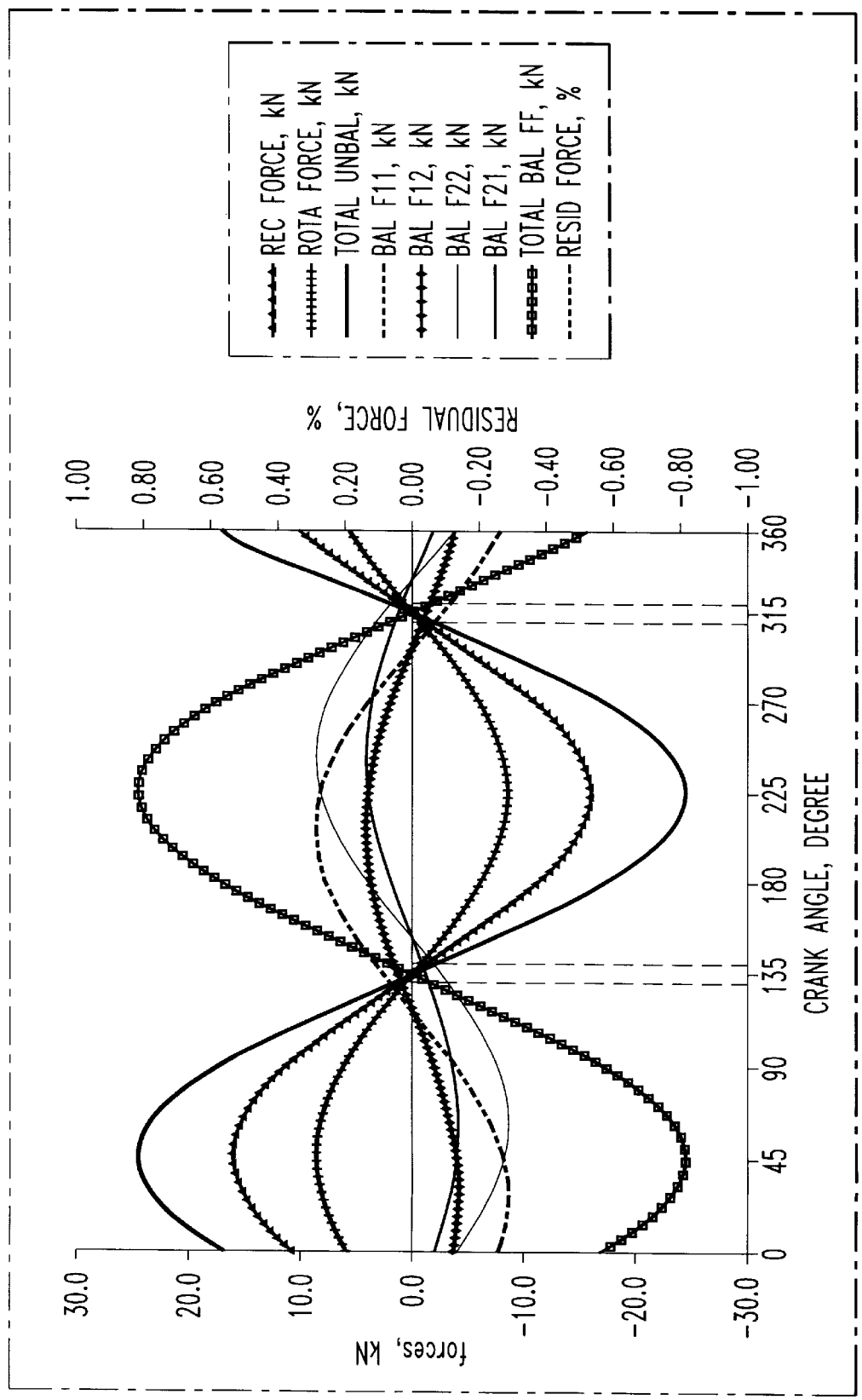
FIG. 18 is a graphical depiction of those reciprocating and rotational forces generated within the engine and those balancing forces generated by the present invention to counteract such reciprocating and rotational forces.
Figure 19:
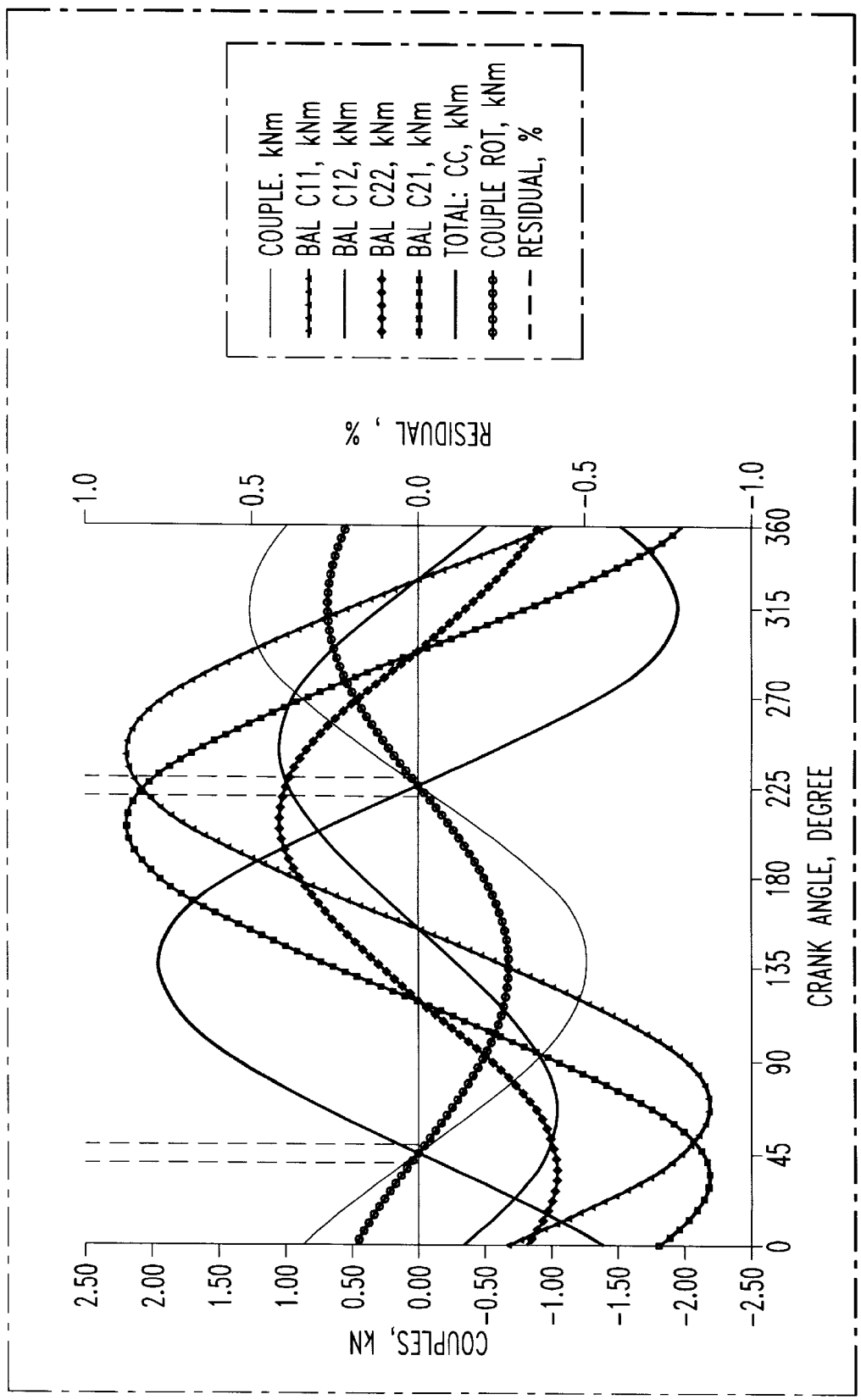
FIG. 19 is a graphical depiction of those couple forces generated within the engine and the balancing forces generated by the present invention to counteract such couple forces.

FIGS. 18 and 19 are additional graphical representations of the present invention's ability to effectively balance reciprocating and rotating forces and couples. More specifically, FIG. 18 is a graphical depiction of the various reciprocating and rotational forces generated by each cylinder and by the balance masses of the present invention. The reader will appreciate that:

"Bal F11"=The reciprocating force generated by the first piston 24 in the first bay 14;

"Bal F12"=The reciprocating force generated by the second piston 25 in the first bay 14;

"Bal F22"=The reciprocating force generated by the second piston 28 in the second bay, 16;

"Bal F21"=The reciprocating force generated by first piston 27 in the second bay 16;

"Rec. Force"=The total reciprocating forces (unbalanced) generated in both bays (14, 16);

"Rota Force"=The total rotational forces (unbalanced) generated by the pistons;

"Total unbal"=The total unbalance forces within the engine (i.e., total unbalanced reciprocating forces+the total unbalanced rotational forces);

"Total bal FF"=The total forces generated by the balance masses (88, 88' 122, 122') of the present invention; and "Resid force"=The remaining or residual amount of forces remaining when the balance masses forces cancel (i.e., balance) the total unbalanced forces.

Thus, as can be seen from FIG. 18, there is very little residual reciprocating and rotational forces remaining in the engine after the balance masses have been added in accordance with the present invention.

FIG. 19 is a graphical depiction of the couple forces generated within the engine 12 wherein:

"Couple"=The total couple forces generated from the reciprocating forces within the engine bays;

"Bal C11"=The couple created by balance mass 88';

"Bal C12"=The couple generated by the balance mass 122';

"Bal C22"=The couple generated by balance mass 122;

"Bal C21"=The couple generated by balance mass 88;

"Total CC"=(C22+C21)–(C11+C12);

"Couple Rot"=Total couples generated from the rotational forces within the engine;

"Residual"=(Couple+TotalCC+CoupleRot)/(Couple+Total Recip.)*100. Therefore, as can be seen from FIG. 18, after applying the balance masses in accordance with the present invention, the remaining couple forces within the engine are very small.

The skilled artisan will appreciate that the timing and placement of the balance masses are designed such that the forces of the balance masses counteract and effectively cancel each other in a plane perpendicular to the cylinders. There is essentially an infinite choice in the particulars of the timing and positioning of the balance masses for balancing the reciprocating inertia and vertical forces. The balance masses of the subject invention are also arranged to balance the inherent unbalanced couple of the reciprocating pistons.

Thus, from the foregoing discussion, it is apparent that the present invention has many advantages over the prior apparatuses and methods employed to balance various forces within an engine. By mounting the balance masses coaxial with the crankshaft, less space is occupied by those members within the engine. Such coaxial arrangement of the balance masses also enable larger swing radiuses of the balance masses to be employed when compared to prior arrangements. The weight required for the balancing masses is inversely proportional to the radius of swing thereof. Thus, the unique mounting arrangement for the balancing masses of the present invention enable smaller balancing masses to be employed. Also, by coaxially mounting the balancing masses directly to the crankshaft, those rotating masses tend to act directing on the crankshaft which can lead to a reduction of the bearing forces, crankcase forces, and vibration, generated when compared to a conventional arrangement that utilizes balance weights mounted, to separate shafts within the engine. In such conventional methods, the unbalanced forces are transmitted through the engine bearings to the crank case. That is, the balancing shaft balancing forces a re transmitted through the bearings of the two balance shafts into the crankcase where they combine with and cancel the unbalanced forces from the crankshaft. In the present invention, the unbalanced and balanced forces act directly on the crankshaft with the force cancellation occurring within the crankshaft. Little or no unbalance or countering balance force is transmitted to the crankcase. Thus, engine bearings can be made smaller which leads to a light and less costly engine. Also, by coaxially mounting the balance masses to the crankshaft, the need for additional counterweight shaft arrangements employed in prior balance arrangements are not required. Therefore, the present invention can result in a lighter more compact engine. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. Balancing apparatus for an engine having a rotating crankshaft that has a crankshaft axis, said balancing apparatus comprising:
    a first balance mass non-rotatably affixed to the crankshaft;
    a second balance mass rotatably supported on the crankshaft;
    a driver attached to the crankshaft for causing said second balance mass to rotate in a direction opposite to the direction of rotation of the crankshaft;
    a first gear non-rotatably affixed to the crankshaft;
    a second gear non-rotatably affixed to said second balance mass;
    at least one auxiliary gear in intermeshing engagement with said first and second gears such that rotation of the crankshaft in a first direction causes said second gear and said second balance mass to rotate about the crankshaft in a second rotational direction opposite to said first rotational direction; and
    an output shaft attached to at least one of said auxiliary gears for transmitting rotational motion to an auxiliary device.

2. The balancing apparatus of claim 1 wherein the crankshaft rotates at a speed and wherein said first balance mass and said second balance mass rotate at speeds that are substantially equivalent to the rotational speed of the crankshaft.

3. The balancing apparatus of claim 1 wherein said first balance mass comprises:
    a first hub coaxially attached to the crankshaft; and
    a first mass affixed to said first hub.

4. The balancing apparatus of claim 3 wherein said first mass is integrally formed with said first hub such that the center of gravity of said first mass is a predetermined first distance from the axis of the crankshaft.

5. The balancing apparatus of claim 1 wherein said second balance mass comprises:
    a second hub coaxially received on the crankshaft for rotation therearound; and
    a second mass affixed to said second hub.

6. The balancing apparatus of claim 5 where in said second mass is integrally formed with said second hub and wherein said second mass has a center of gravity that is a second predetermined distance from the axis of the crankshaft.

7. The balancing apparatus of claim 1 further comprising a gear cage supportable on the crankshaft, said gear cage supporting said auxiliary gears therein.

8. The balancing apparatus of claim 1 wherein the auxiliary device is selected from the group consisting of hydraulic pumps and vacuum pumps.

9. Balancing apparatus for an engine having a rotating crankshaft that has a crankshaft axis, said apparatus comprising:
    a first balance mass non-rotatably attached to the crankshaft;
    a second balance mass rotatably supported on the crankshaft;
    a first gear non-rotatably attached to the crankshaft;
    a second gear non-rotatably attached to said second balance mass;
    at least one first auxiliary gear in intermeshing engagement with said first and second gears such that rotation of the crankshaft in a first direction causes said second gear and second balance mass to rotate about the crankshaft in a second rotational direction opposite to the first rotational direction;
    an output shaft attached to at least one of said first auxiliary gears for transmitting rotational power to an auxiliary device;
    a primary balance mass affixed to the crankshaft;
    a secondary balance mass rotatably supported on the crankshaft; and
    a fore driver affixed to the crankshaft for causing said secondary balance mass to rotate about the crankshaft in the direction that is opposite to the rotational direction of the crankshaft.

10. The balancing apparatus of claim 9 wherein the crankshaft rotates at a speed and wherein said second and secondary balance masses rotate at speeds that are substantially equivalent to the speed of the crankshaft.

11. The balancing apparatus of claim 9 further comprising
    a first gear cage supportable on the crankshaft, said first gear cage supporting first auxiliary gears therein.

12. The balancing apparatus of claim 9 wherein said fore driver comprises:
    a primary gear non-rotatably affixed to the crankshaft;
    a secondary gear non-rotatably affixed to said secondary balance mass and intermeshed with said primary gear such that rotation of the crankshaft in a primary direction causes said secondary gear and said secondary balance mass to rotate about the crankshaft in a secondary rotational direction opposite to the primary rotational direction.

13. The balancing apparatus of claim 12 further comprising:
    at least one second auxiliary gear in intermeshing engagement with said primary and secondary gears;
    a primary gear cage supported on the crankshaft, said primary gear cage supporting said second auxiliary gears therein; and
    an output shaft attached to at least one of said second auxiliary gears.

14. The balancing apparatus of claim 9 wherein the auxiliary device is selected from the group consisting of hydraulic pumps and vacuum pumps.

15. An engine balance mechanism, comprising:
    a rotatable crankshaft defining a shaft axis;
    a first balance mass assembly affixed to said crankshaft;
    a second balance mass supported on said crankshaft for rotation relative thereto;
    a first gear non-rotatably affixed to said crankshaft;

a second gear non-rotatably affixed to said second counterweight;

at least one auxiliary near in intermeshing engagement with said first and second gears such that rotation of said first gear about said shaft axis in a first direction causes said second gear and said second balance mass to rotate about said shaft axis in a second rotational direction opposite to said first rotational direction;

an output shaft attached to at least one of said auxiliary gears for transmitting rotational motion to an auxiliary device.

16. The balance mechanism of claim 15 wherein said driver is an integral part of said crankshaft.

17. The balance mechanism of claim 15 wherein said first balance mass comprises:

a first hub coaxially affixed to said crankshaft; and a first mass affixed to said first hub.

18. The balance mechanism of claim 17 wherein said first mass is integrally formed with said first hub such that the center of gravity of said first mass is a predetermined first distance from said shaft axis.

19. The balance mechanism of claim 15 wherein said second balance mass comprises:

a second hub coaxially received on said crankshaft for rotation therearound; and a second mass affixed to said second hub.

20. The balance mechanism of claim 19 wherein said second balance mass is integrally formed with said second hub and wherein said second balance mass has a center of gravity that is a second predetermined distance from said shaft axis.

21. The engine balance mechanism of claim 15 further comprising a gear cage supported on said crankshaft, said gear cage supporting said auxiliary gears therein.

22. The engine balance mechanism of claim 15 wherein the auxiliary device is selected from the group consisting of hydraulic pumps and vacuum pumps.

23. An engine balance mechanism for use in an engine having a rotating crankshaft that has a crankshaft axis, said engine balance mechanism comprising:

a first hub coaxially affixed to the crankshaft;

a first balance mass attached to said first hub in spaced-apart relationship thereto by at least two spaced first arms;

a second hub rotatably received on the crankshaft;

a second balance mass attached to said second hub in spaced-apart relationship thereto by at least two spaced second arms;

a first gear affixed to the crankshaft;

a second gear affixed to said second hub;

at least one auxiliary gear in intermeshing engagement with said first and second gears.

24. The engine balance mechanism of claim 23 further comprising two auxiliary gears between said first and second gears, each said auxiliary gear having an output shaft thereon.

25. An engine balance mechanism, comprising:

a crankshaft defining a shaft axis;

a first balance mass affixed to the crankshaft;

a second balance mass rotatably supported on said crankshaft;

a first gear non-rotatably affixed to said crankshaft;

a second near non-rotatably affixed to said second balance mass;

at least one first auxiliary gear in intermeshing engagement with said first and second gears such that rotation of said first gear about said shaft axis in a first direction causes said second gear and said second balance mass to rotate about said shaft axis in a second rotational direction opposite to said first rotational direction;

an output shaft attached to at least one of said first auxiliary gears for transmitting rotational motion to an auxiliary device;

a primary balance mass affixed to said crankshaft;

a secondary balance mass rotatably supported on said crankshaft; and a fore driver affixed to said crankshaft for causing said secondary balance mass to rotate about said crankshaft in said direction that is opposite to said rotational direction of said crankshaft.

26. The engine balance mechanism of claim 25 further comprising a first gear cage supported on said crankshaft, said first gear cage supporting said first auxiliary gears therein.

27. The engine balance mechanism of claim 25 wherein said fore driver comprises:

a primary gear non-rotatably affixed to said crankshaft;

a secondary gear non-rotatably affixed to said secondary counterweight and intermeshed with said primary gear such that rotation of said primary gear about said shaft axis in a primary direction causes said secondary gear and said secondary counterweight to rotate about said shaft axis in a secondary rotational direction opposite to said primary rotational direction.

28. The engine balance mechanism of claim 27 further comprising:

at least one second auxiliary gear in intermeshing engagement with said primary and secondary gears;

a primary gear cage supported on said crankshaft, said primary gear cage supporting said second auxiliary gears therein; and an output shaft attached to at least one of said second auxiliary gears.

29. The engine balance mechanism of claim 25 wherein the auxiliary device is selected from the group consisting of hydraulic pumps and vacuum pumps.

30. Balancing apparatus for an engine having a rotating crankshaft, said balancing apparatus comprising:

a first balance mass non-rotatably affixed to the crankshaft;

a second balance mass rotatably supported on the crankshaft;

a means for driving said second balance mass in a direction opposite to the direction of rotation of the crankshaft, said means for driving coaxially affixed to the drive shaft; and auxiliary drive means in intermeshing engagement with said means for driving, said auxiliary drive means having output means thereon for transmitting rotational motion to an auxiliary device.

31. A drive assembly for driving a mass rotatably mounted on a rotating shaft in a predetermined rotational direction about the rotating shaft, said drive assembly comprising:

a first gear affixed to the rotating shaft;

a second gear affixed to the mass; and at least one third gear intermeshed between said first and second gears, at least one said third gear having an output shaft thereon for transmitting rotational motion to an auxiliary device.

32. The drive assembly of claim 31 wherein said third gears are supported within a gear cage operably supported on said rotating shaft.

33. An internal combustion engine, comprising:
a rotatably supported crankshaft;
a plurality of pistons operably supported within the engine and affixed to said crankshaft for causing said crankshaft to rotate in a first direction;
a first balance mass non-rotatably affixed to said crankshaft;
a second balance mass rotatably supported on said crankshaft;
a first gear non-rotatably attached to the crankshaft;
a second gear non-rotatably attached to said second balance mass;
at least one first auxiliary gear in intermeshing engagement with said first and second gears such that rotation of the crankshaft in a first direction causes said second gear and said second balance mass to rotate about the crankshaft in a second rotational direction opposite to the first rotational direction; and
an output shaft attached to at least one of said first auxiliary gears for transmitting rotational motion to an auxiliary device.

34. The engine of claim 33 further comprising:
a primary balance mass affixed to the crankshaft;
a secondary balance mass rotatably supported on the crankshaft; and
a second driver affixed to the crankshaft for causing said secondary balance mass to rotate about the crankshaft in said second direction.

35. The engine of claim 33 further comprising:
a first gear cage supportable on the crankshaft, said first gear cage supporting said first auxiliary gears therein.

36. The engine of claim 33 wherein said second driver comprises:
a primary gear non-rotatably affixed to the crankshaft;
a secondary gear non-rotatably affixed to said secondary balance mass and intermeshed with said primary gear such that rotation of the crankshaft in a primary direction causes said secondary gear and said secondary balance mass to rotate about the crankshaft in a secondary rotational direction opposite to the primary rotational direction.

37. The engine of claim 36 further comprising:
at least one second auxiliary gear in intermeshing engagement with said primary and secondary gears;
a primary gear cage supported on the crankshaft, said primary gear cage supporting said second auxiliary gears therein; and
an output shaft attached to at least one of said second auxiliary gears.

38. A method for counteracting forces generated within an engine having a rotating crankshaft that generates a rotational force and rotates in a first direction, comprising:
affixing a first balance mass to the crankshaft;
supporting a second balance mass on the crankshaft for coaxial rotation about an axis of the crankshaft;
utilizing a portion of the rotational force generated by the crankshaft to cause said second balance mass to rotate about the crankshaft in a second direction opposite to the first direction; and
utilizing another portion of the rotational force generated by the crankshaft to power an auxiliary device within the engine.

39. The method of claim 38 further comprising:
affixing a primary balance mass to said crankshaft;
supporting a secondary balance mass on said crankshaft for coaxial rotation about the crankshaft axis; and
further utilizing at least another portion of the rotational force of the crankshaft to cause said secondary balance mass to rotate about the crankshaft in said second direction.

40. The method of claim 38 wherein said utilizing another portion of the rotational force generated by the crankshaft comprises:
affixing a first gear to the crankshaft;
affixing a second gear to the second balance mass;
intermeshing an auxiliary gear with the first and second gears, the auxiliary gear having an output shaft thereon; and
coupling the output shaft of the auxiliary gear to the auxiliary device.

41. An engine balance mechanism, comprising:
a rotatable crankshaft defining a shaft axis;
a first balance mass assembly affixed to said crankshaft;
a second balance mass supported on said crankshaft for rotation relative thereto;
a driver affixed to said crankshaft for causing said second balance mass to rotate in a direction that is opposite to a rotational direction of said crankshaft; and
an axial lubrication passage extending through said rotatable crankshaft and communicating with said driver.

42. The engine balance mechanism of claim 41 wherein said driver comprises:
a first gear non-rotatably affixed to said crankshaft;
a second gear non-rotatably affixed to said second balance mass and communicating with said first gear such that rotation of the crankshaft in a first direction causes said second gear and said second balance mass to rotate about the crankshaft in a second rotational direction opposite to said first rotational direction.

43. The engine balance mechanism of claim 42 further comprising a radially extending lubrication passage through a portion of said crankshaft for communicating lubrication flowing through said axial lubrication passage to said second balance mass.

44. The engine balance mechanism of claim 43 wherein said second balance mass has a bearing portion for rotatably supporting said second balance mass on said crankshaft and wherein said radially extending lubrication passage coincides with said bearing portion.

45. An engine balance mechanism for use in an engine having a rotating crankshaft that has a crankshaft axis, said engine balancing apparatus comprising:
a first hub coaxially affixed to the crankshaft, said first hub having a first cavity therein;
a first balance mass attached to said first hub;
a first gear received in said first cavity in said first hub and being non-rotatably attached thereto;
a second hub rotatably received on the crankshaft, said second hub having a second cavity therein;
a second balance mass attached to said second hub;
a second gear received within said second cavity and affixed to said second hub; and
at least one auxiliary gear in intermeshing engagement with said first and second gears.

* * * * *